United States Patent [19]

Kupferschmidt et al.

[11] Patent Number: 4,812,942
[45] Date of Patent: Mar. 14, 1989

[54] AERIAL CABLE TERMINAL

[75] Inventors: Albert Kupferschmidt, Highland Park; Trace D. Greene, Glenview; Donald F. Jaycox, Deerfield, all of Ill.

[73] Assignee: Northern Telecom Limited, Montreal, Canada

[21] Appl. No.: 43,401

[22] Filed: Apr. 28, 1987

[51] Int. Cl.[4] .......................... H01R 9/00; H02G 15/10
[52] U.S. Cl. ...................................... 361/119; 174/41; 174/44; 174/59
[58] Field of Search .................. 174/41, 44, 59, 60; 361/119, 129

[56] References Cited

U.S. PATENT DOCUMENTS

| 2,859,390 | 11/1958 | Baker | 174/59 X |
|---|---|---|---|
| 4,414,426 | 11/1983 | Burtelson | 174/41 X |
| 4,513,171 | 4/1985 | Suffi et al. | 174/41 |

FOREIGN PATENT DOCUMENTS

| 587523 | 11/1933 | Fed. Rep. of Germany | 174/60 |
|---|---|---|---|
| 1149857 | 7/1957 | France | 174/44 |
| 354497 | 7/1961 | Switzerland | 174/60 |
| 468917 | 7/1937 | United Kingdom | 174/59 |
| 648799 | 1/1951 | United Kingdom | 174/59 |
| 721684 | 1/1955 | United Kingdom | 174/59 |

*Primary Examiner*—Laramie E. Askin
*Attorney, Agent, or Firm*—Foley & Lardner, Schwartz, Jeffery, Schwaab, Mack, Blumenthal & Evans

[57] ABSTRACT

An aerial terminal has an increased density of connections and can be mounted alternatively on a pole or a cable. It has a housing with parallel side walls and end walls and a central wall extending across between the side walls, forming back and front chambers. A plurality of apertures extend in rows in the central wall and terminals are positioned in the apertures. The terminals are arranged in pairs, the front ends being in the front chamber and the back ends in the back chamber. Protector modules can be provided as part of a terminal for each pair. An openable cover and support brackets are also provided.

19 Claims, 27 Drawing Sheets

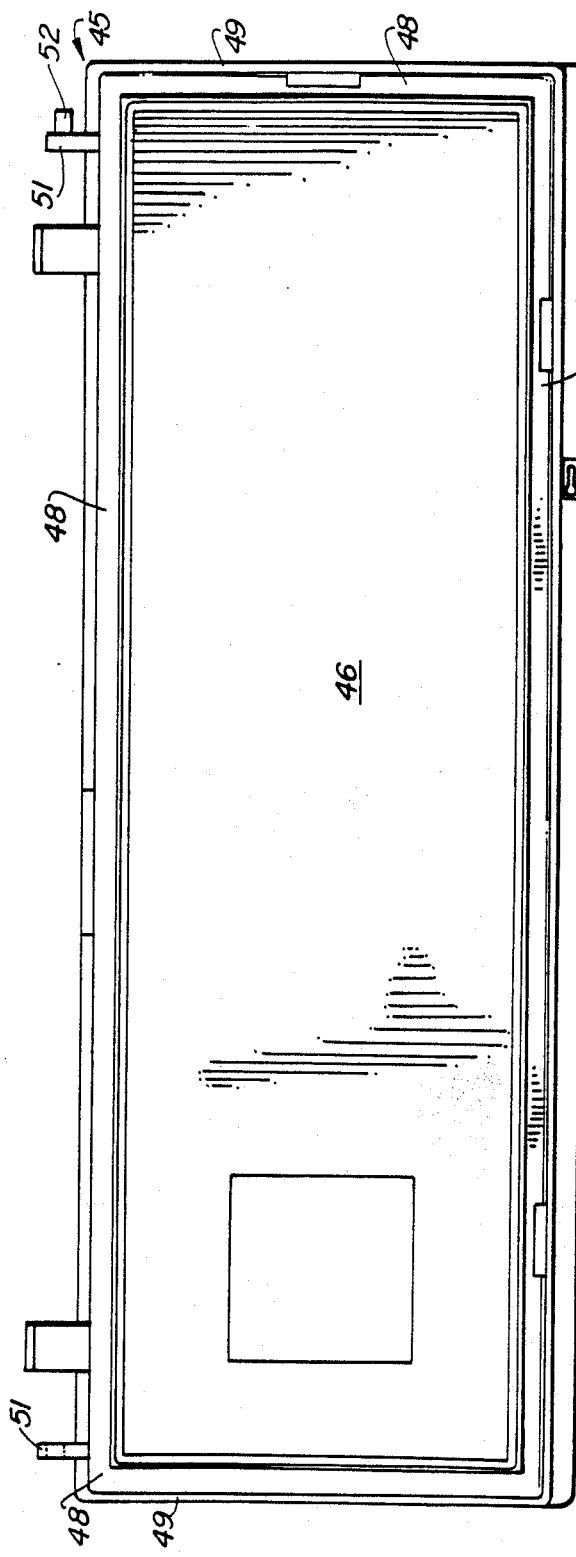
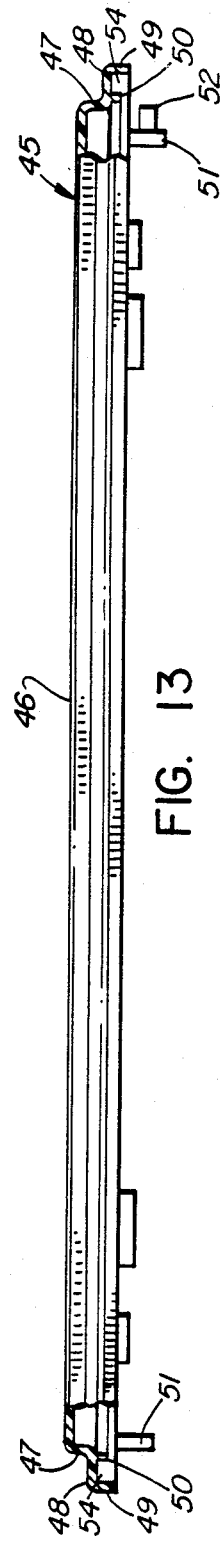
FIG. 12
FIG. 13

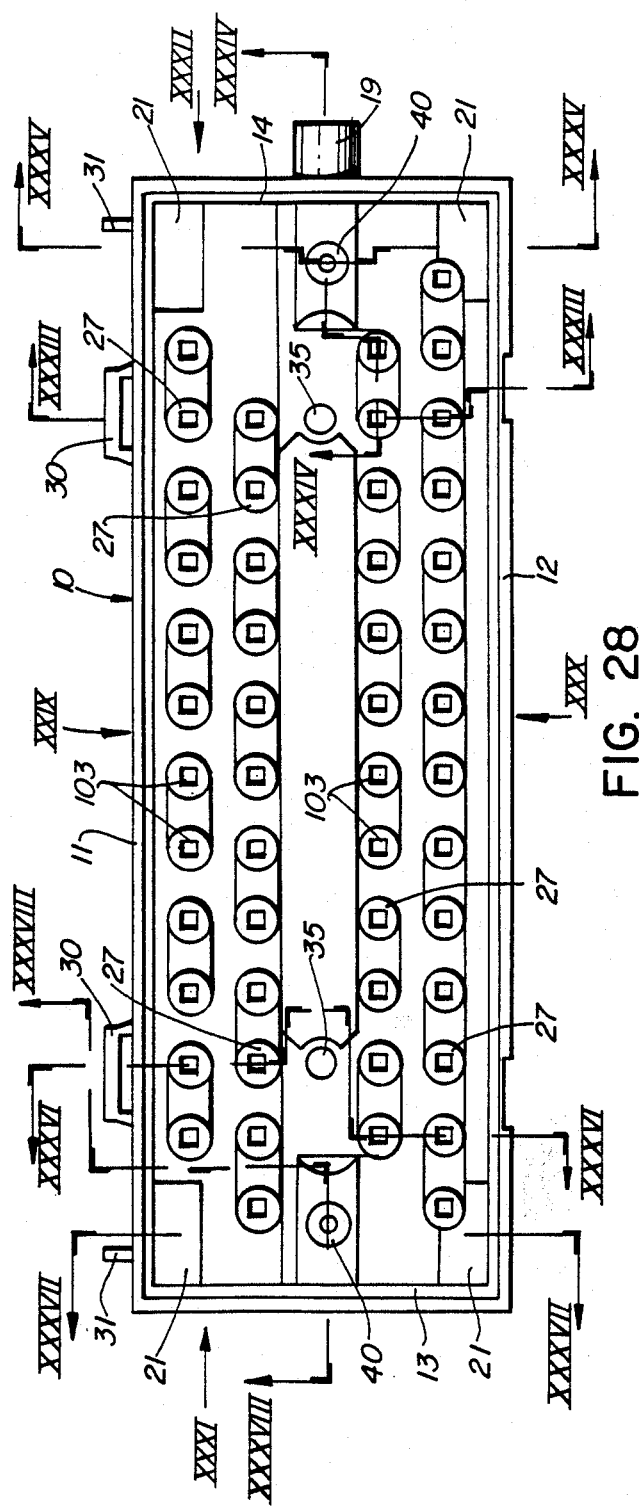
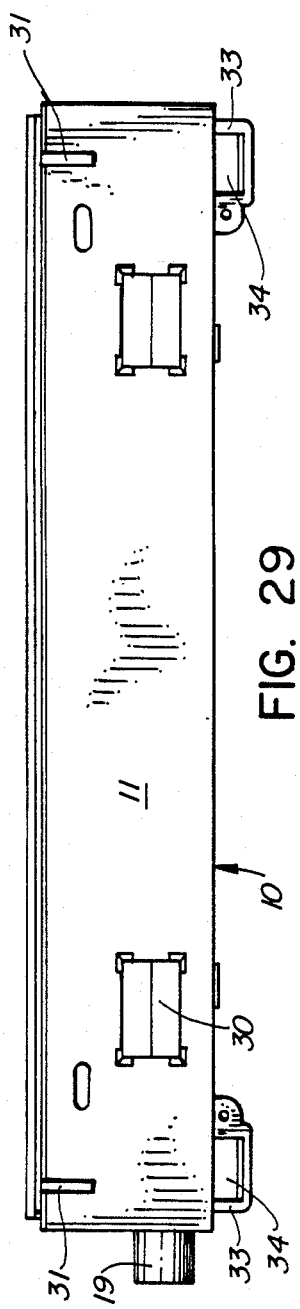
FIG. 28
FIG. 29

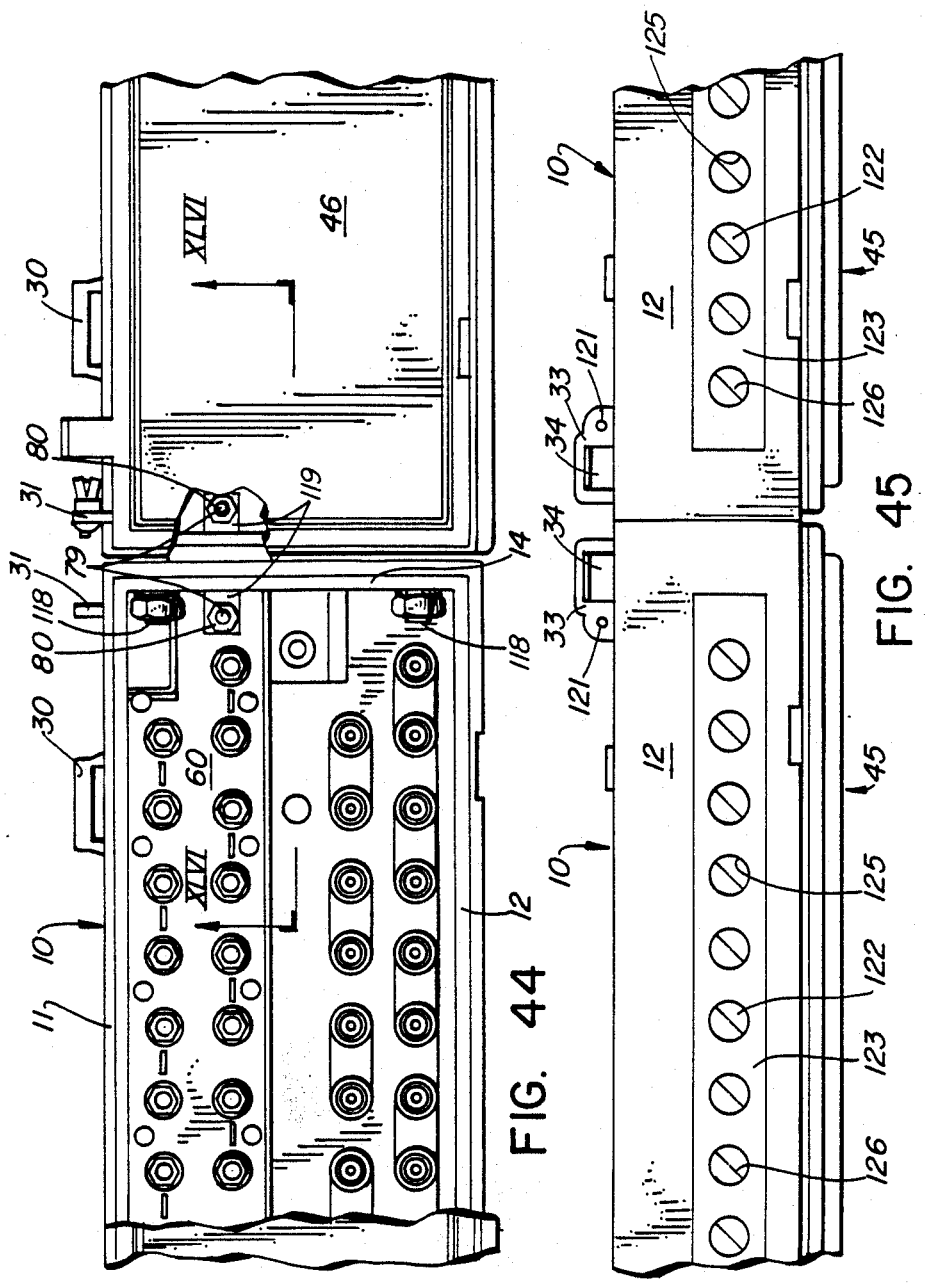

AERIAL CABLE TERMINAL

BACKGROUND OF THE INVENTION

1. Field of the Invention

This invention relates to aerial cable terminals and is particularly concerned with terminals for connecting local distribution conductors to a main cable.

2. Related Art

The aerial terminals are usually suspended from the main cable. A stub cable is spliced at one end into the main cable, with the conductors of the stub cable connected to rear ends of conductor terminals in the aerial terminal. The local distribution conductors, often referred to as "drop wires", are connected to front ends of the conductor terminals. The conductor terminals extend in rows and are arranged as pairs, with one conductor terminal of a pair being in one row and the other conductor terminal of a pair being in another row. One conductor terminal of a pair is for the Tip conductor and the other is for the Ring conductor.

SUMMARY OF THE INVENTION

The present invention provides an aerial cable terminal which has an increased density of connections and which can be mounted alternately on a pole, as well as being suspended on a cable.

An aerial terminal in accordance with the present invention has an elongate hollow housing with side walls, end walls and central wall extending across the housing between the side walls. The central wall forms two chambers in the housing, front and back chambers, and a plurality of apertures extend through the central wall. The apertures extend in rows and a terminal is mounted in each aperture with opposite ends extending into the two chambers the terminals arranged to be in pairs. A removable cover the front chamber and access in one end wall provides for entry stub cable into the back chamber. Support hangers provide for suspension on a cable and the ends of the housing have formations at the back for mounting and positioning on a pole.

BRIEF DESCRIPTION OF THE DRAWINGS

The invention will be readily understood by the following description in conjunction with the accompanying drawings, in which:

FIG. 12 is a front view of a cover;

FIG. 13 is a side view of the cover in the direction of arrow XIII in FIG. 12, the ends in section;

FIG. 28 is a front view of an alternative form of housing;

FIGS. 29 and 30 are side views in the direction of arrows XXIX and XXX, respectively, on FIG. 28;

FIGS. 44 and 45 are front and side views, respectively, illustrating two terminals as in FIGS. 14 to 17 joined together;

DETAILED DESCRIPTION OF THE EMBODIMENTS

One form of cable terminal for providing surge protection for the connections, in accordance with the invention, has an elongate hollow housing forming a main body member, as illustrated in FIGS. 1 to 11. In this example, the elongate housing 10 has parallel side walls 11 and 12, and end walls 13 and 14 extending between the side walls. A central wall 15 extends between the side walls 11 and 12, generally at a position intermediate the front and back edges of the side walls. The central wall 15 divides the housing into front and back chambers, 16 and 17 respectively.

Figure 11:
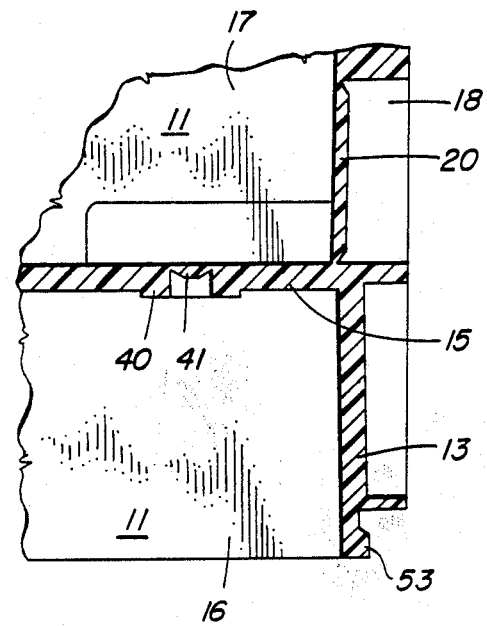

Access to the back chamber 17 is provided in each end wall. In the example illustrated, an aperture 18 is provided in end wall 13 and an aperture and tubular extension 19 is provided at the other end wall 14. The aperture and tubular extension 19 is normally used for the entrance of a stub cable and the aperture 18 is blanked off by a "breakout" diaphragm 20 (FIG. 11). The diaphragm can readily be removed if access is required, for example for a further stub cable, or if two terminals are to be connected together.

The central wall, for a major part of its length, is at two levels, 15a and 15b, one level, 15a, being closer to the front of the housing and the other level, 15b, being closer to the rear of the housing. Adjacent each end wall a recess 21 is formed in the central wall at each corner of the housing, for a purpose explained later.

A plurality of pairs of tubular bosses 25 are formed in the level 15a of the central wall, the bosses extending into the back chamber 17. An extra single boss 26 is formed at each end.

A further plurality of tubular bosses 27 are formed in the level 15b of the central wall. The bosses 27 extend into the front chamber 16. The bosses 27 each have a square bore 28 and a circular hole 29 is formed at the front end of each boss.

On one side wall, side wall 11 in the example, support brackets 30 are provided. Brackets 30 enable straps to be extended over a cable, or other support member, to hold the terminal in position. Also, adjacent each end of the side wall 11, adjacent its front edge, are provided webs 31 which provide pivotal mounting positions for a cover.

The end walls 13 and 14 have a concave back edge 32. The back edge of each end wall extends, at each end, beyond the back edge of each side wall and has a thickened section 33 formed by the recesses 21. A rectangular passage 34 is formed through each section 33, the passages extending in a direction normal to the length of the housing. The sections 33, with passages 34, form mounting brackets for mounting a terminal on a pole or similar member. The concave form of the back edge 32 acts to position the terminal on the pole and straps can be passed through the passages 34 and around the pole to secure the terminal in place.

A further means for mounting a terminal on a pole is provided by two hollow bosses 35 on the longitudinal centre-line. These bosses extend through the back chamber 17 and have back surfaces 36 which are level with the back edges of the end walls. A "breakout", or "knockout" diaphragm 37 is provided in each boss 35. By removal of the diaphragm 37, bolts, such as carriage bolts, can be used to attach the terminal to a pole.

Two further small bosses 40 are provided adjacent each end of the central wall. These bosses provide mounting positions for grounding terminals which can be attached to a cable sheath, as will be described later. Again, "knockout" diaphragms 41 can be provided.

In side wall 12, a plurality of apertures 42 are provided. These provide access to the front chamber 16 for local distribution conductors or "drop wires". The apertures 42 are closed by a rubber sealing member, as will be described.

FIGS. 12 and 13 illustrate a cover 45 for mounting on the housing 10 of FIGS. 1 to 11. The cover is of generally elongate planar form with a somewhat sinuous edge or rim formation viewed in cross-section, as seen in FIG. 13. Thus the cover has a main web portion 46 with a first peripherally extending rib 47 extending normal to the web portion. The cover then extends outwardly with an annular peripherally extending portion 48, finally having a peripherally extending rim 49, extending in the same direction as rib 47. Extending parallel to the rim 49, approximately at the inner edge of the portion 49, is a further shallow rib 50 extending peripherally.

Figure 14:
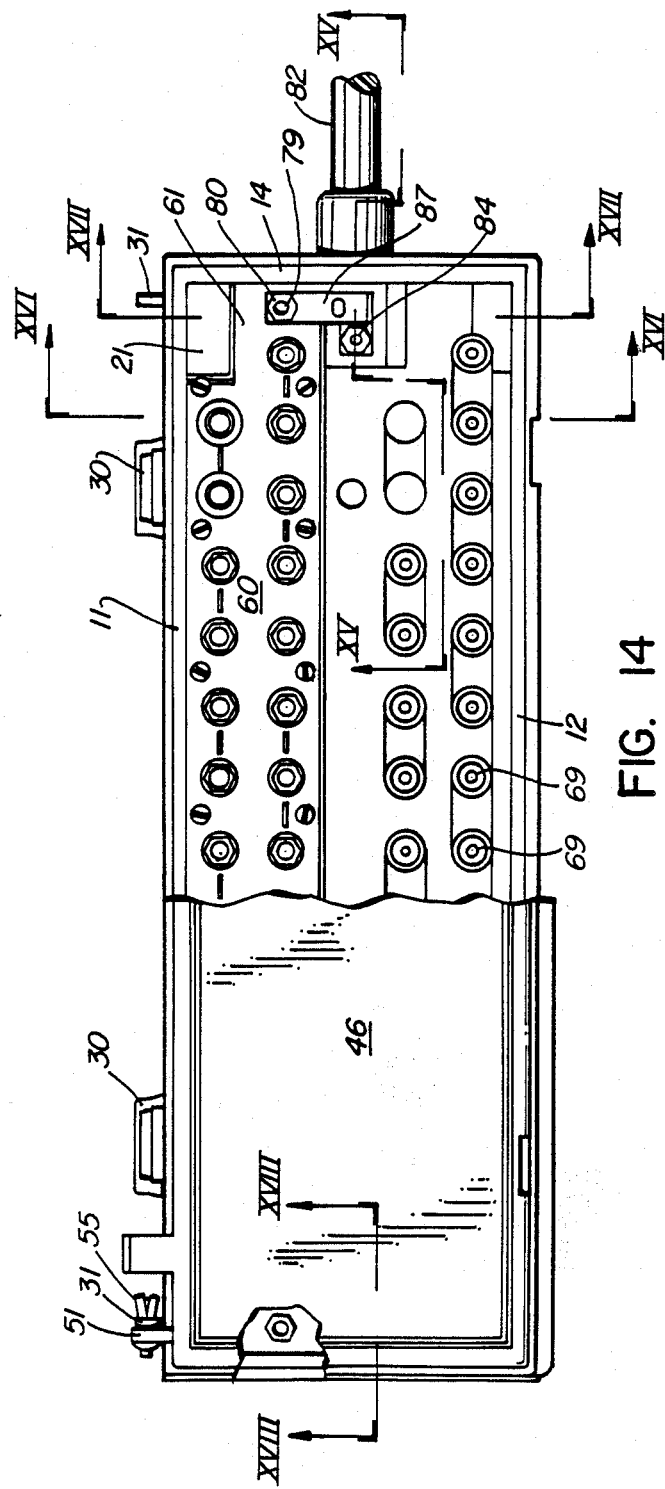
FIG. 14 is a front view of an assembled aerial terminal with a housing as in FIGS. 1 to 11 with the cover shown partly removed.

Extending out from one edge of the cover are two mounting brackets 51. The brackets extend normal to the periphery of the cover and also downwardly below the periphery of the cover. Brackets 51 cooperate with the webs 31 on the housing. One bracket 51 has an axial extension 52 which is a rotational fit in a hole in one web 31. A split cotter pin 55 is inserted through holes in the other bracket 51 and web 31, as is seen in FIG. 14.

The annular recess 54 defined between the rim 49 and rib 50 fits over rim formation 53 on the housing.

FIGS. 14, 15, 16 and 17 illustrate an assembled cable terminal. Positioned on the front surface of the level 15a of the central wall is a metal groundplate 60. The groundplate extends the length of the housing 10, being recessed at the corners, 61 in FIG. 14, to extend around recess 21. The groundplate rests between the side wall 11 and a shallow rib 62 at the edge of level 15a remote from side wall 11. At positions aligned with and coxial with the bosses 25, the groundplate is apertured, with the peripheral edge of its apertures being formed upward to form a lip 63, which is internally threaded.

A boss 25 is paired with a boss 27. In the example, the bosses 25 are in two rows on level 15a and the bosses 27 are in two rows on level 15b. The row of bosses 25 closest to the side wall 11 is paired with the row of bosses 27 remote from the wall 12.

A cup-shaped member 67 is positioned in the lower end of each boss 25, the closed ends facing upward. Downwardly directed projections 68 extend from the lower edge of each cup-shaped member. A terminal stud 69 is positioned in each of the smaller bosses 27, each terminal stud having a square section 70 which fits in the square hole 28 in each boss 27. A connection tang 71 extends down from each terminal stud. Connection is made between a cup-shaped member 67 and the related terminal stud 69 by a wire connection 72 attached at one end to tang 71 and at the other end to one of the projections 68. The conductors from the stub cable are connected to the other ones of the projections 68 at each large boss 25 position.

Screwed into each internally threaded lip 63 is a metal cap 65. Caps 65 are hollow with a closed end 66 which has a hexagonal shape by which the cap can be screwed into the lip. Between each cap 65 and the associated cup-shaped member 67 is positioned a protector module 73, the major portion of the module being within the cup 65. A locating member 74 is positioned against the lower electrode 75 of the module, and a compression spring 76 extends between the locating member 74 and the cup-shaped member 67.

Generally, the stub cable is assembled to the cable terminal at the manufacturing plant, a conductor being connected to each projection 68, the Tip conductor to one terminal stud and the Ring conductor to the other terminal stud of an associated pair of bosses 25. The local distribution conductors, or drop wires, are connected to the front ends of the terminal studs 69, by the nuts 77. Under normal conditions, there is direct connection only between stub cable conductors and the local distribution conductors, from projections 68 to terminal studs 69. However, in the event of an overvoltage surge occurring on a conductor, there is a breakdown to ground in the protector module 73 connected to the conductor.

Figure 15:
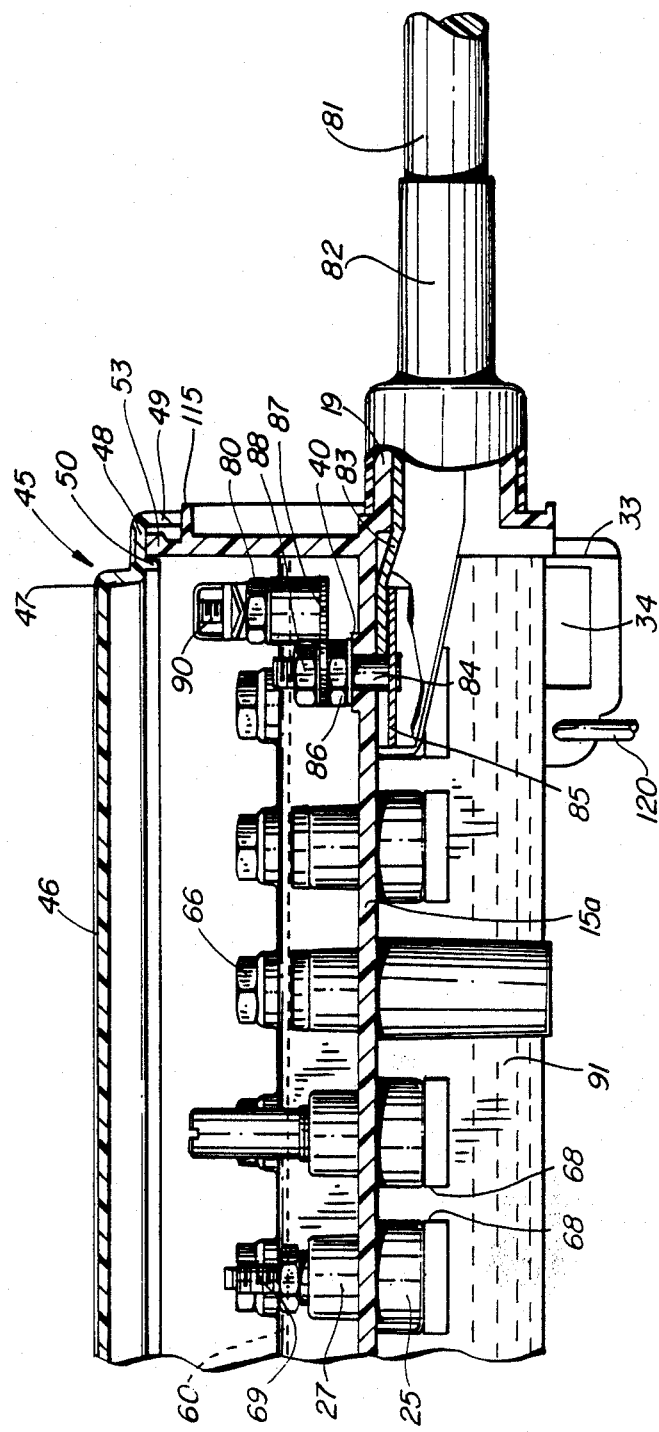
FIG. 15 is a cross-section on the line XV—XV of FIG. 14.

A ground connection is made to the groundplate 60 by means of a ground terminal 79 and nut 80 at one end of the housing or cable terminal. The ground terminal 79 is also connected to the metal sheath of the stub cable. This is illustrated in FIG. 15, and also in FIG. 17. A stub cable, 81, enters into the housing 10 via the tubular extension 19, a tubular sleeve 82 sealing the entry. The cable end is opened up, and a slit made in the end of the metal sheath 83. A ground connector or clamp 84 is inserted into the slit, a plate 85 on the inner end of the connector 84 being on the inside of the sheath 83. The connector extends through boss 40 and is fastened in position by nut 86. A metal strip 87 is connected to the connector 84 by nut 88 at one end and is connected to the ground terminal 79 by nut 80 at the other end. A further nut 89 attaches a ground connection 90. This can be used to connect a ground wire.

When the conductors of a stub cable have been connected to the projections 68 and the wire connections 72 also made, the back chamber 17 is filled with a potting compound, indicated by dotted lines 91.

Figure 1:
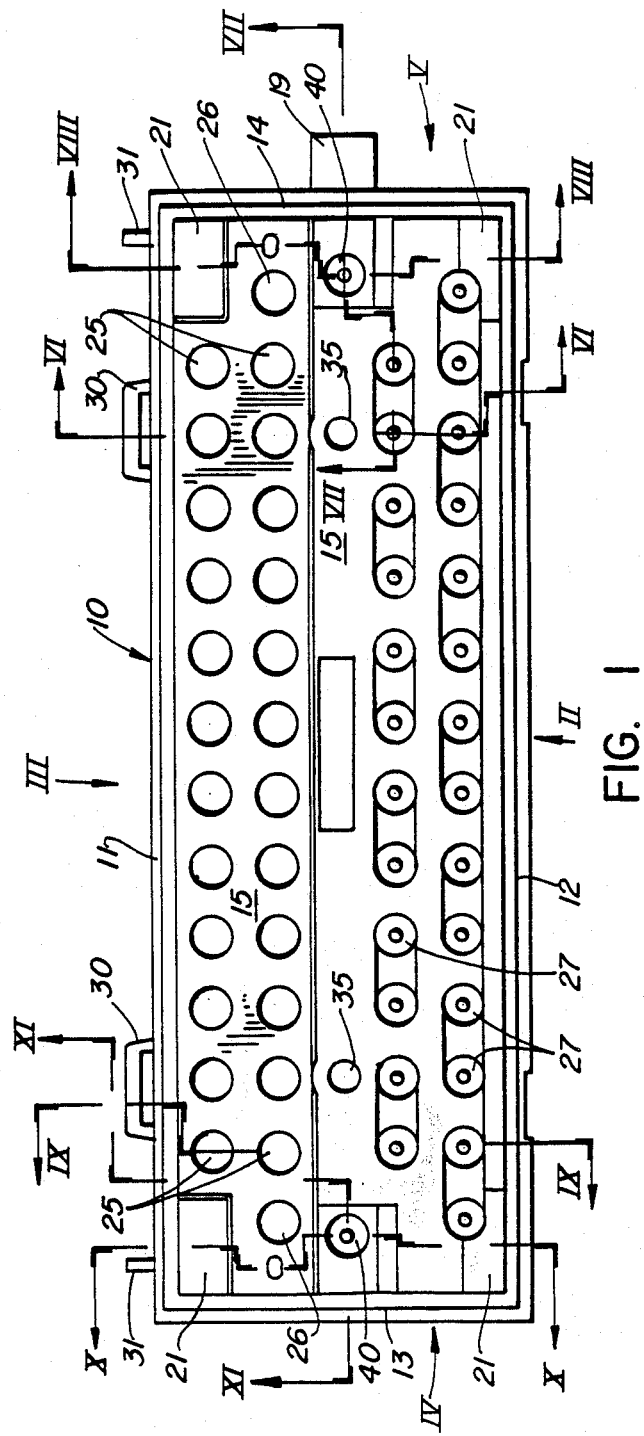
FIG. 1 is a front view of one form of housing for a twelve pair connection.
Figure 2:
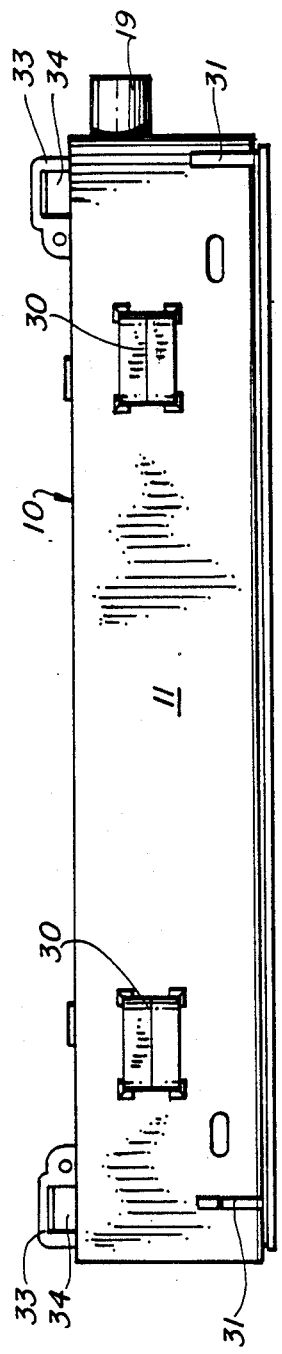
FIG. 2 is a side view in the direction of arrow II in FIG. 1.
Figure 3:
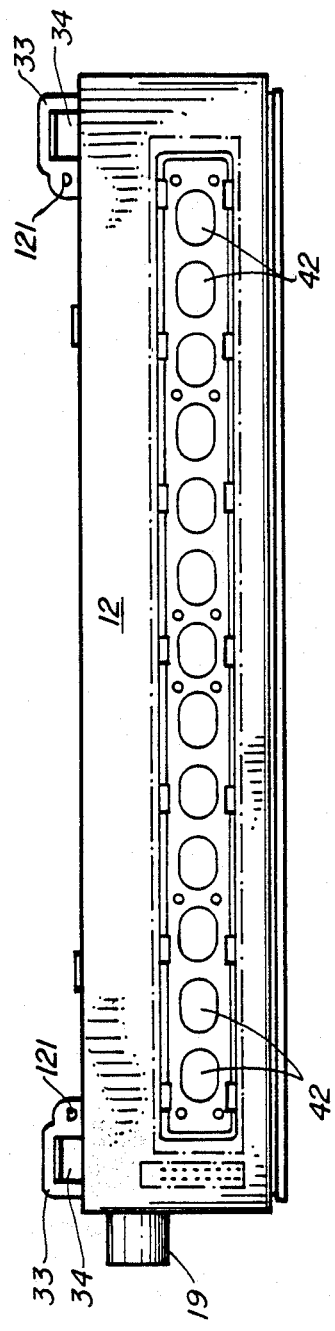
FIG. 3 is a side view in the direction of arrow III in FIG. 1.
Figure 4:
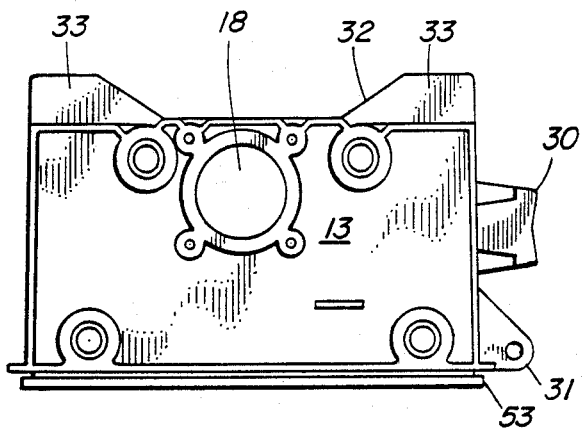
FIG. 4 is an end view in the direction of arrow IV in FIG. 1.
Figure 5:
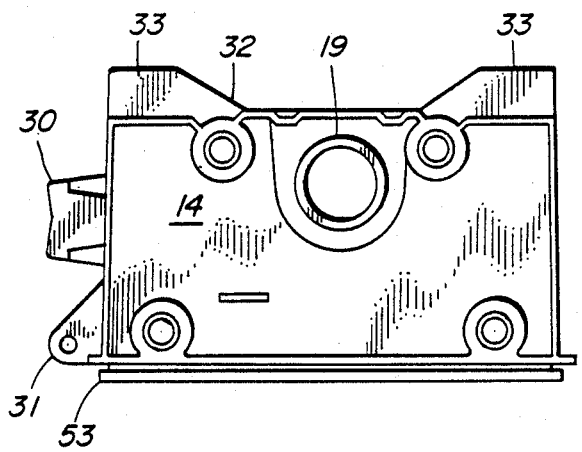
FIG. 5 is an end view in the direction of arrow V in FIG. 1.
Figure 6:
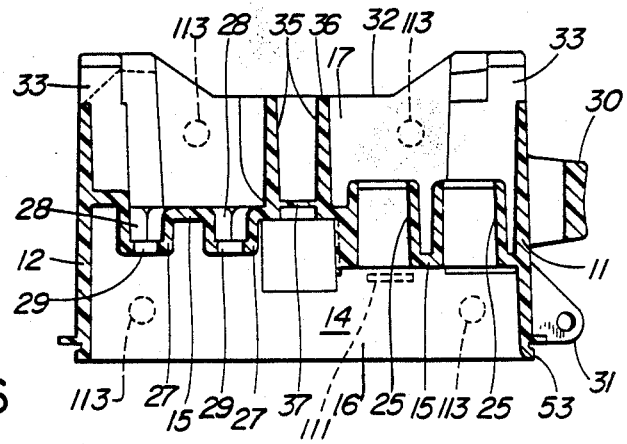
FIGS. 6 to 11 are cross-sections on the lines VI—VI to lines XI—XI, respectively, on FIG. 1.
Figure 7:
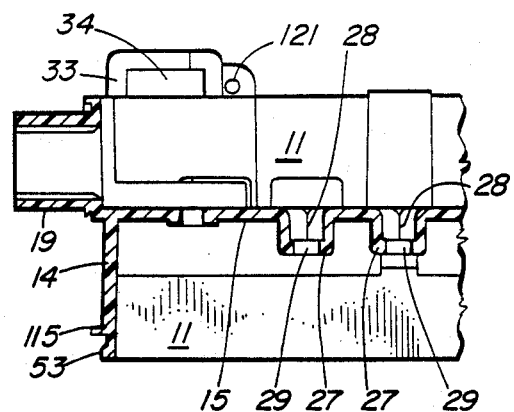
Figure 8:
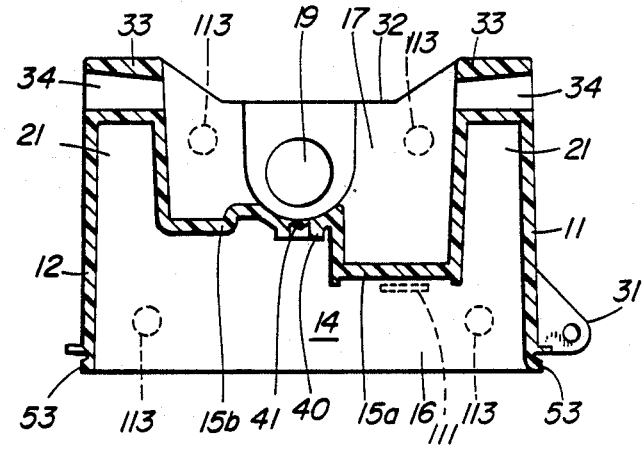
Figure 9:
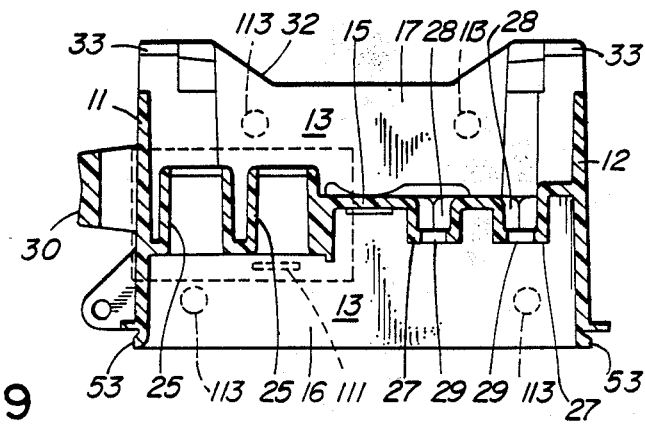
Figure 10:
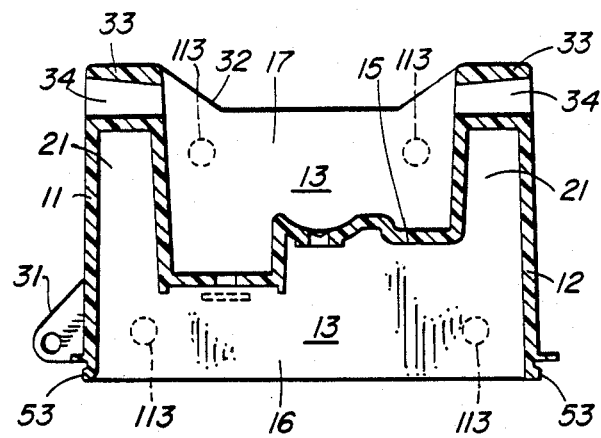
Figure 18:
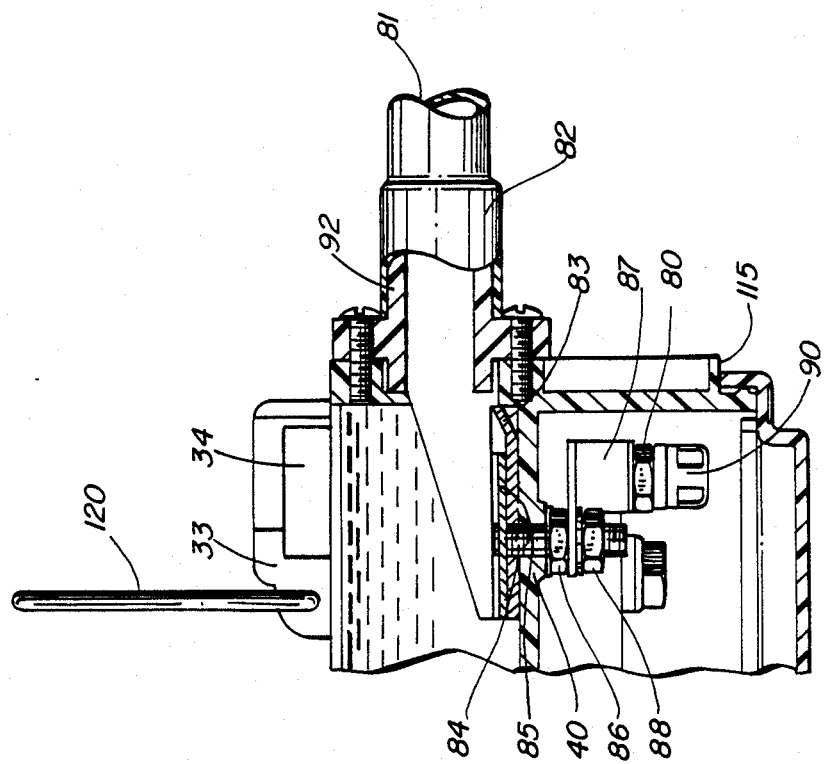
Figure 19:
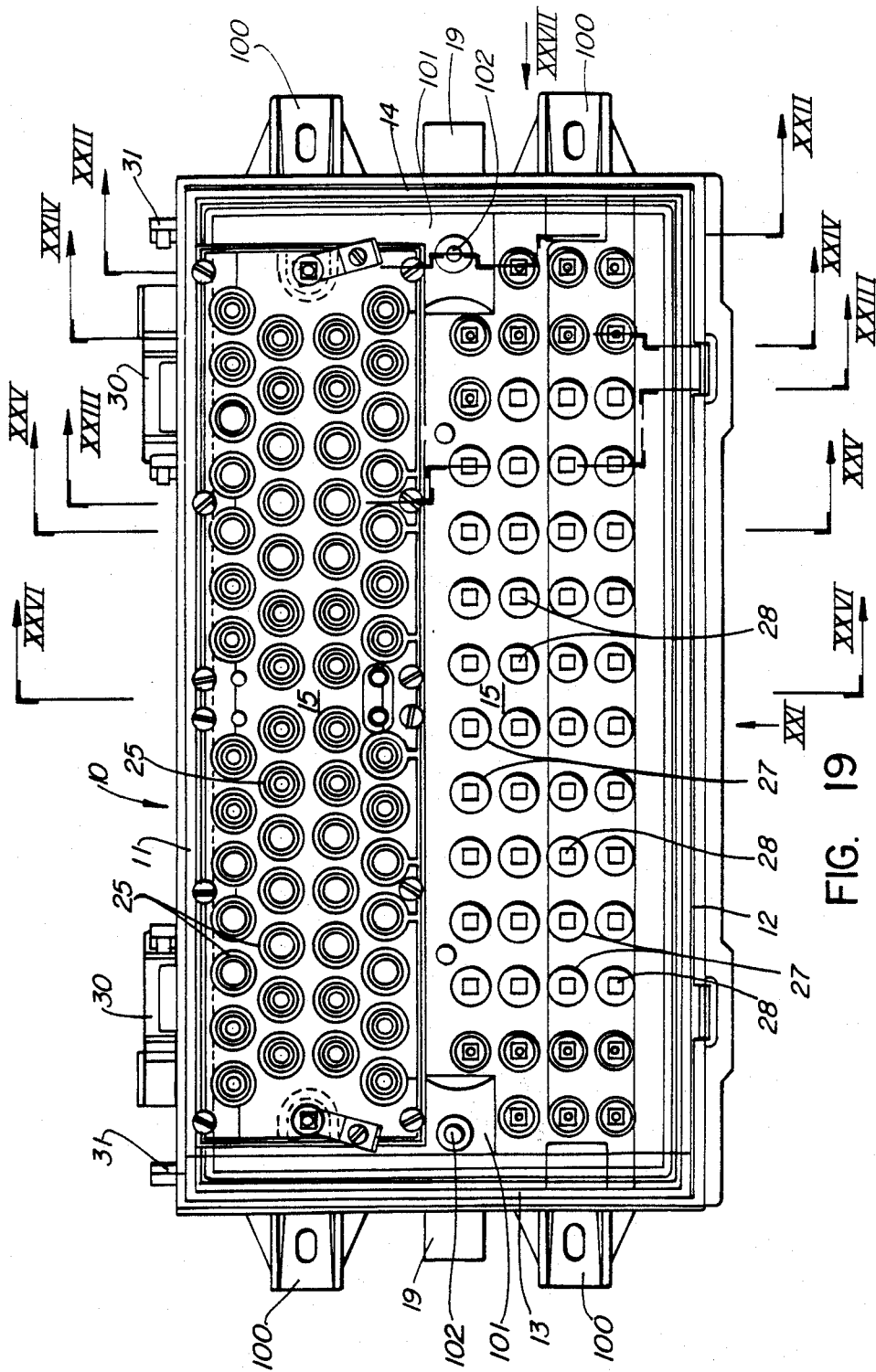
FIG. 19 is a top plan view of an alternative form of housing for a twenty-five pair connection with the cover removed.
Figure 20:
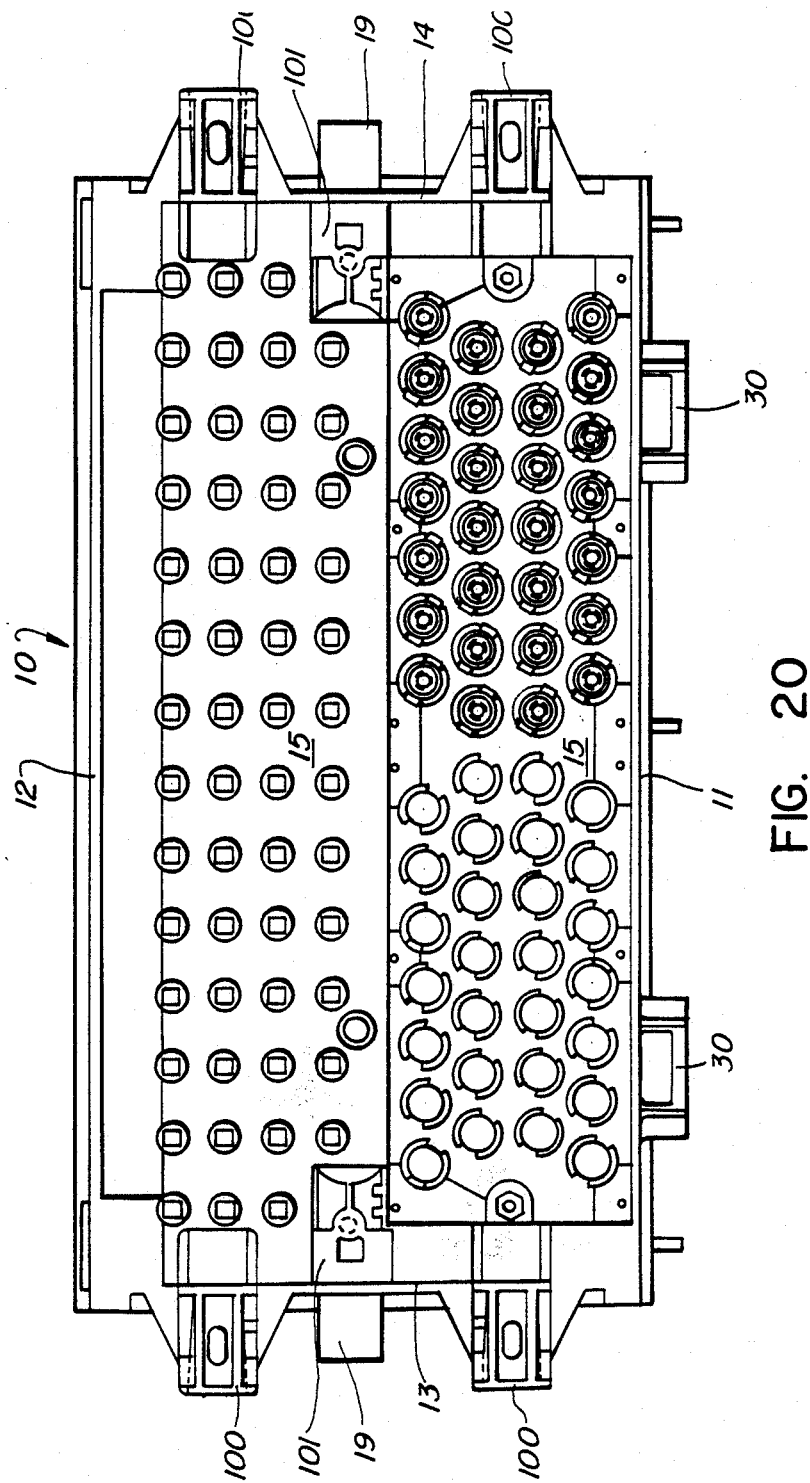
FIG. 20 is a bottom plan view of the housing of FIG. 19.
Figure 21:
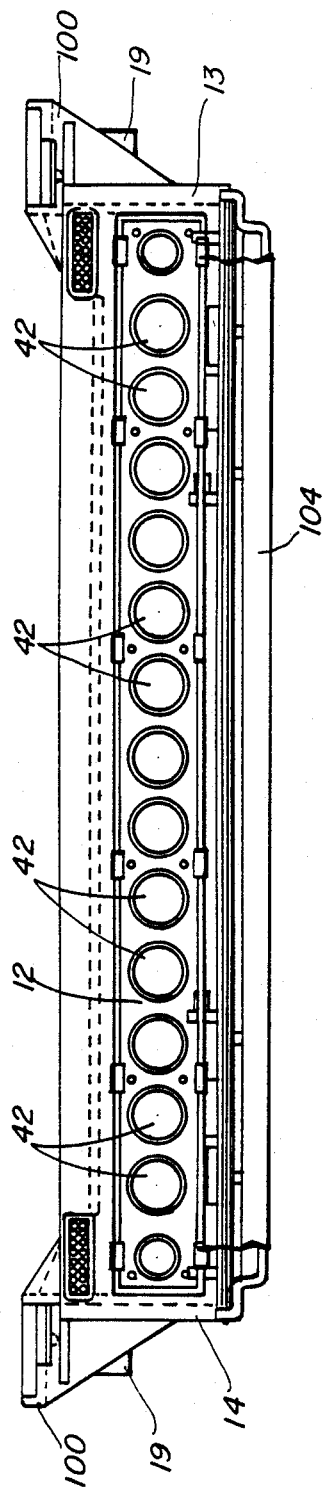
FIG. 21 is a side view of the housing of FIGS. 19 and 20, with a cover in position, showing access for local conductors, in the direction of arrow XXI FIG. 19.

A stub cable can also be brought in from the other end of the housing, and this is illustrated in FIG. 18 a tubular extension 92 being bolted on over the aperture 18 (FIG. 4). The same reference numerals are used for the same items as in FIG. 15.

In addition to providing protection for an overvoltage surge, it is also possible to provide for an over-current condition, by use of a suitable protector module 73.

The previously described embodiment provides for the connection of twelve pairs of drop wires, or local distribution wires, to a cable. Two of the aerial terminals can be joined end-to-end and will then provide connection for twenty-five pairs of drop wires.

FIGS. 19 to 27 illustrate an alternative embodiment for providing connection for twenty-five pairs of drop wires, also with surge protection. In the embodiment illustrated in FIGS. 19 to 27, the capacity has been doubled by making the aerial terminal wider. Where applicable, the same reference numerals are used for the same items in FIGS. 19 to 27 as in FIGS. 1 to 17.

The terminal as illustrated in FIGS. 19 to 27 has an elongate hollow housing 10 forming a main body member. The housing has parallel side walls 11 and 12 and end walls 13 and 14 extending between the side walls. A central wall 15 extends between the side walls 11 and 12, generally at a position intermediate the front and back edges of the side walls. Central wall 15 divides the housing into front and back chambers, 16 and 17 respectively.

Access to the back chamber is provided in each wall. In the present example a tubular extension 19 is provided at both ends, instead of at only one end as in the examples of FIGS. 1 to 17.

The central wall 15, for the major part of its length, extends at different levels across the housing. From the side wall 11, the central wall extends across at a first level, for approximately half the width of the housing. The central wall then extends at a second level which is a small distance closer to the back of the housing, and then at a third level, finally extending for a fourth level alongside side wall 12. At the first level four rows of bosses 25 are formed, the central rows slightly offset relative to the outside rows. At the second and third levels, two rows of bosses 27 are formed at each level. The bosses 27 extend successively higher as their distance from the center line of the housing increases.

On the side wall 11, support brackets 30 are formed which enable straps to be extended over a cable or other support member to hold the terminal in position. Also, adjacent each end are webs 31 which provide pivotal mounting of the cover.

At each end two brackets 100 are formed, the brackets extending outwardly from the end walls and also rearwardly below the level of the back surface of the housing. The brackets 100 provide positions for straps which pass through the brackets and around a pole or similar member. The brackets 100 also provide a pivotal mounting for loops 120.

Figure 16:
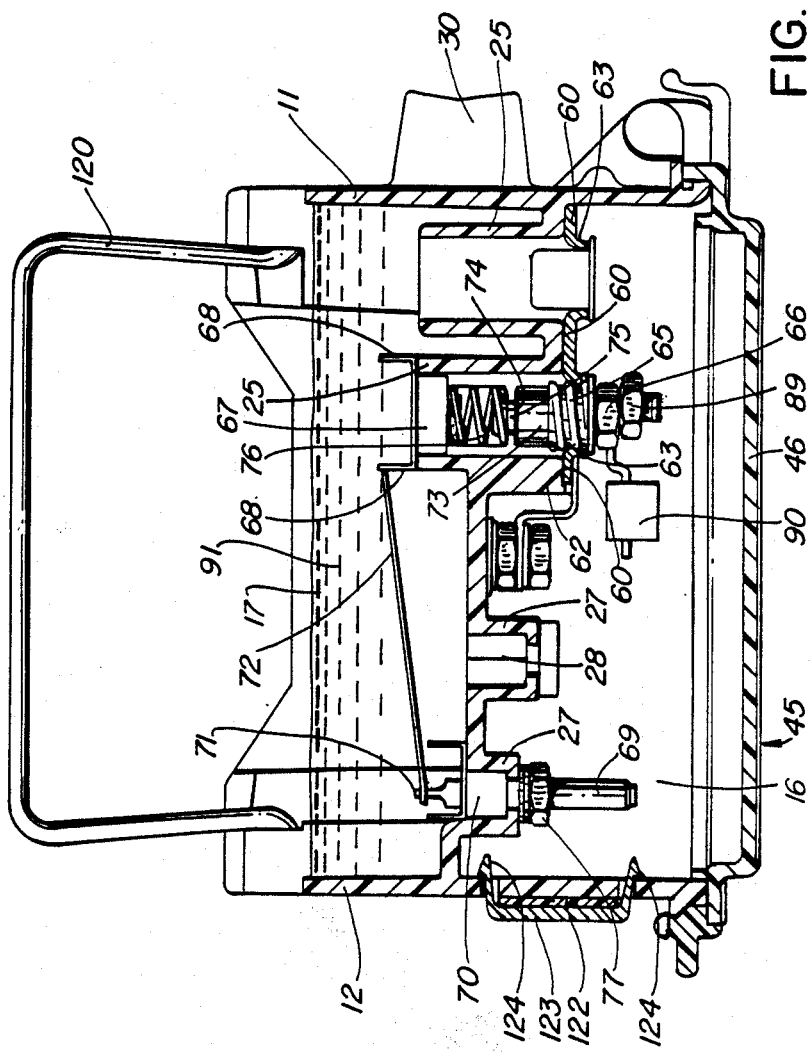
FIGS. 16, 17 and 18 are cross-sections on the lines XVI—XVI, XVII—XVII, and XVIII—XVIII, respectively, of FIG. 14.
Figure 17:
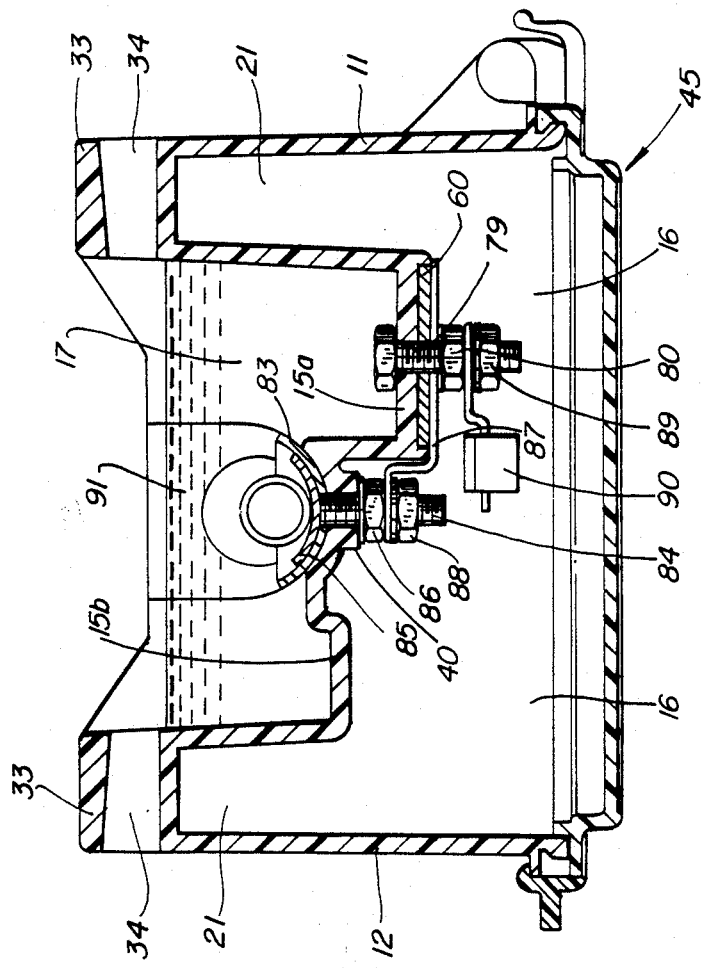

Formed in the central wall, in alignment with the tubular extensions 19, at each end of the housing is an arcuate section 101. An aperture 102 in each section 101 provides for mounting a ground terminal which can be connected to the metal sheath of the cable and can also be connected to the groundplate 60. A knockout diaphragm can be provided in each aperture 102 for closing the aperture if a ground terminal is not present. In side wall 12 a plurality of apertures 42 are provided. These provide access to the front chamber 16 for local distribution conductors or "drop-wires". The apertures 42 are closed by a rubber sealing member and a cover plate, similar to the sealing member 122 and cover plate 123 as illustrated in FIG. 16.

A cover 104 is shown in position in FIGS. 21, 22, 23 and 27. Cover 104 is very similar to the cover 45 as illustrated in FIGS. 12 and 13 except that it is wider, to fit over the wider housing.

A cup-shaped member 67 is positioned in the lower end of each boss 25, the closed ends facing upward. Downwardly directed projections 68 extend from the lower edge of each cup-shaped member. A terminal stud 69 is positioned in each of the bosses 27, each terminal stud having a square section 70 which fits in the square hole 28 in each boss. A connection tang 71 extends down from each terminal stud. Connection is made between a cup-shaped member 67 and the related terminal stud 69 by a wire connection 72 attached at one end to tang 71 and at the other end to one of the projections 68. The conductors from the stub cable are attached to the other ones of the projections 68 at each boss 25 position.

Ground plate 60 extends the length of the housing and has apertures aligned with the bosses 25. The peripheral edges form lips which are internally threaded. A boss 25 is paired with a boss 27. For example, considering FIG. 19, the bosses 27 in the lowest row are paired with the lowest row of bosses 25 and so on, to the top row of bosses 27 being paired with the top row of bosses 25.

Screwed into each internally threaded lip is a metal cap 65. Caps 65 are hollow and have a closed end 66 which has a hexagonal shape by which the cap can be screwed into the lip. Between associated cup-shaped member 67 is positioned a protector module, the major portion of the module being within the cap 65. A locating member 74 is positioned against the lower electrode 75 of the module and a compression spring 76 extends between the locating member 74 and the cup-shaped member 67.

Generally, the stub cable is assembled to the cable terminal at the manufacturing plant, a conductor being connected to each projection 68, the Tip conductor to one terminal stud and the Ring conductor to the other terminal stud of an associated pair of bosses 25. The local distribution conductors, or drop wires, are connected to the front ends of the terminal studs 69, by the nuts 77. Under normal conditions, there is direct connection only between stub cable conductors and the local distribution conductors, from projections 68 to terminal studs 69. However, in the event of an overvoltage surge occurring on a conductor, there is a breakdown to ground in the protector module 73 connected to the conductor.

Figure 22:
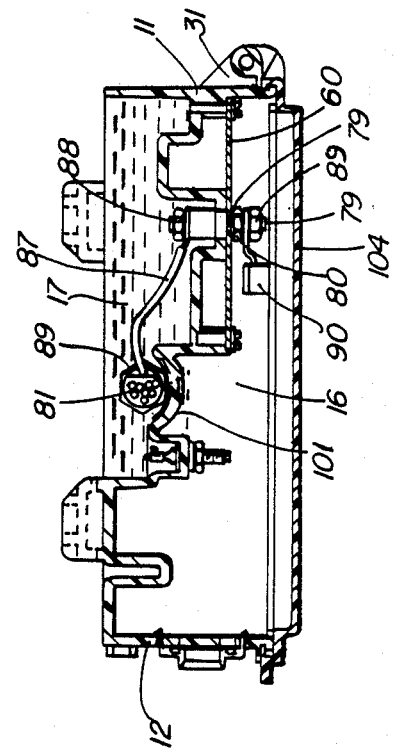
FIGS. 22 to 26 are cross-sections on the lines XXII—XXII to XXVI—XXVI respectively of FIG. 19 with a cover in position in FIGS. 22, 23 and 27.
Figure 23:
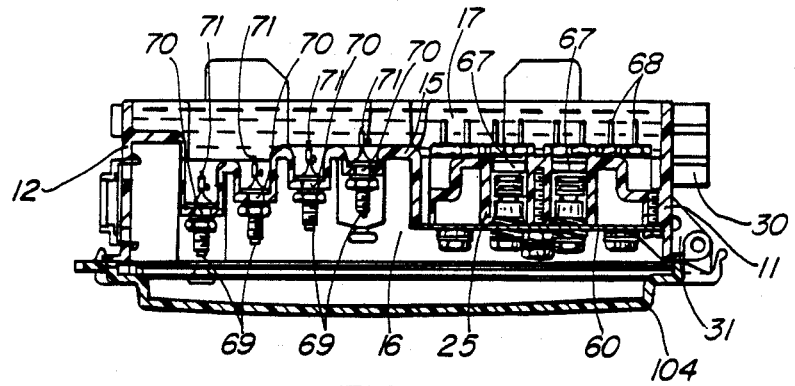
Figure 24:
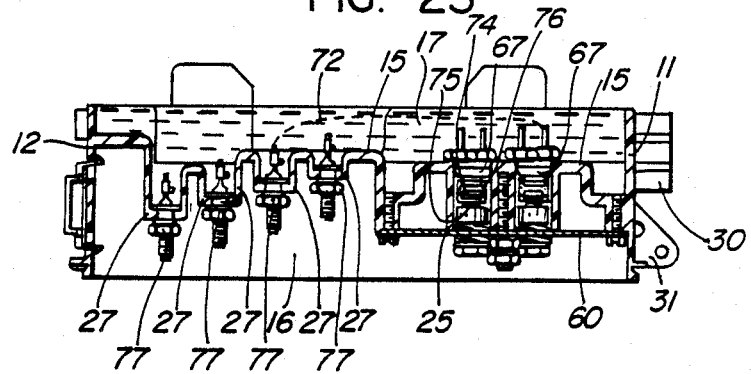
Figure 25:
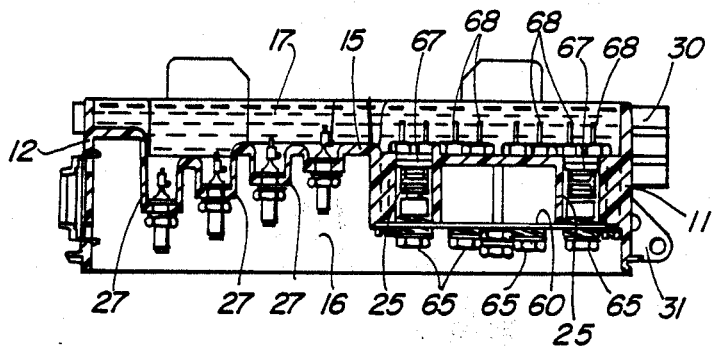
Figure 26:
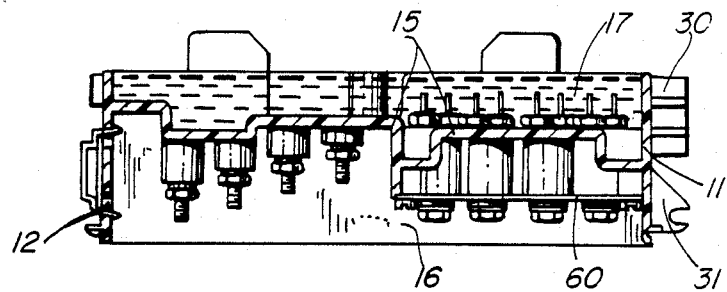
Figure 27:
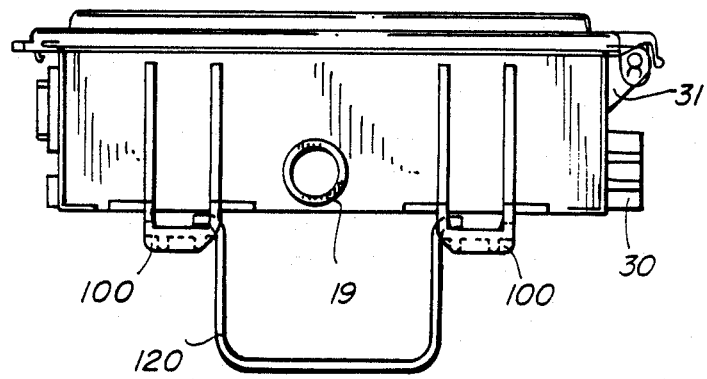
FIG. 27 is an end view in the direction of arrow XXVII in FIG. 19.
Figure 30:
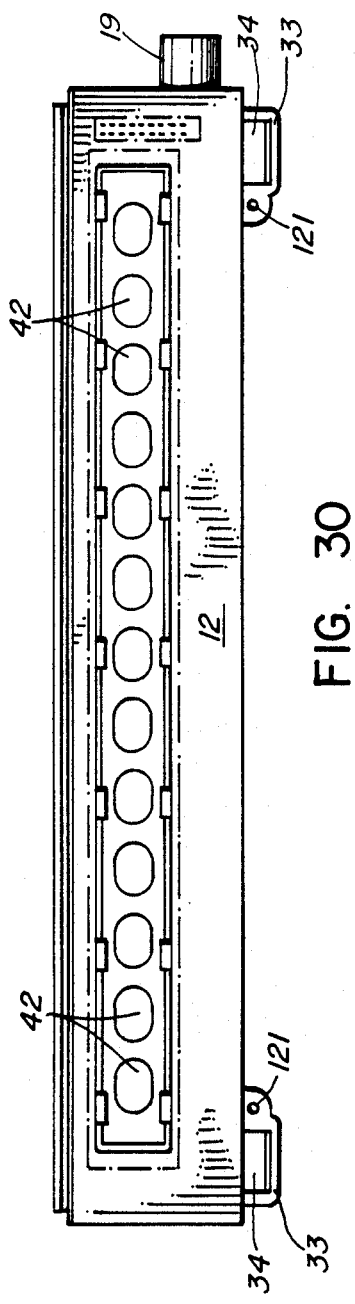
Figure 32:
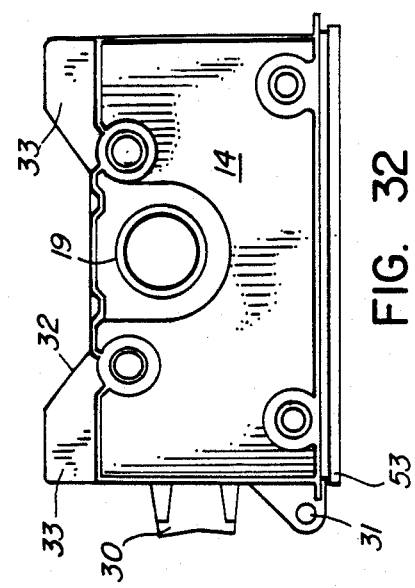
FIGS. 31 and 32 are end views in the direction of arrows XXXI and XXXII, respectively, on FIG. 28.
Figure 31:
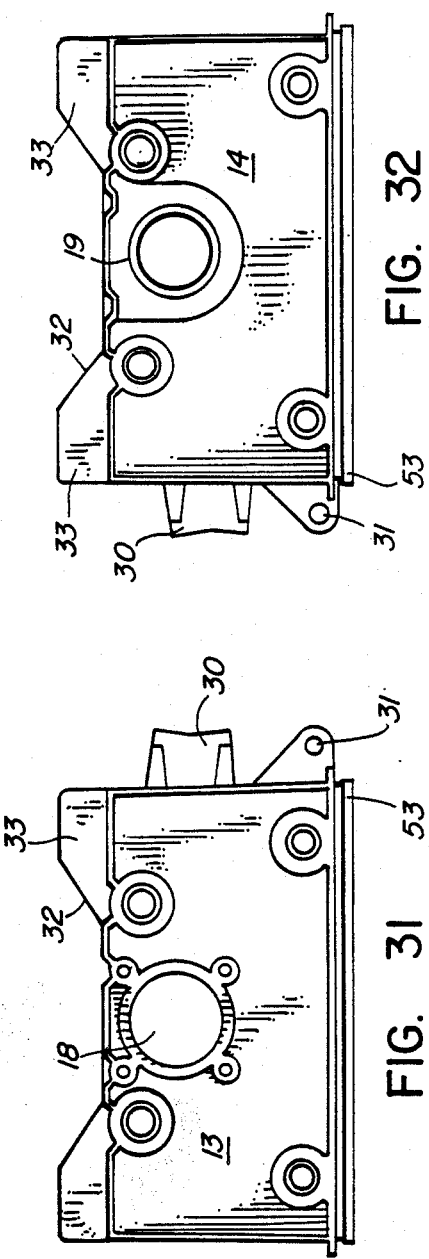
Figure 33:
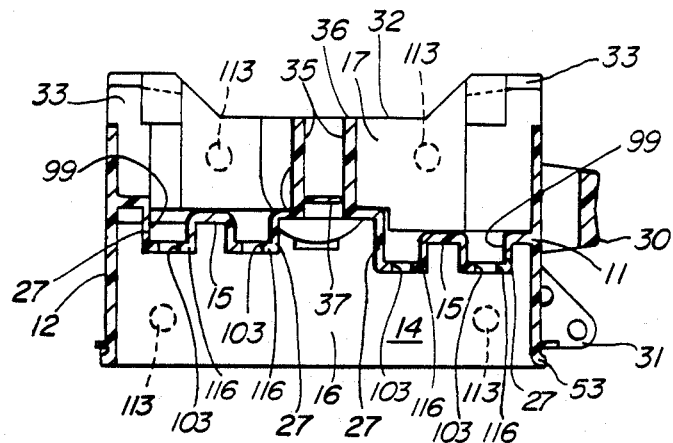
FIGS. 33 to 38 are cross-sections on the lines XXXIII—XXXVIII, to lines XXXVIII—XXXVIII, respectively, on FIG. 28.
Figure 34:
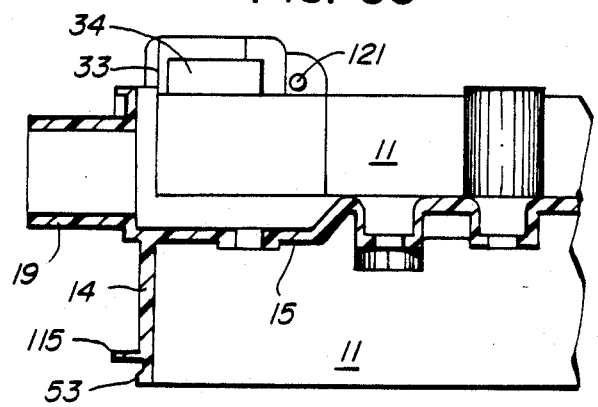
Figure 35:
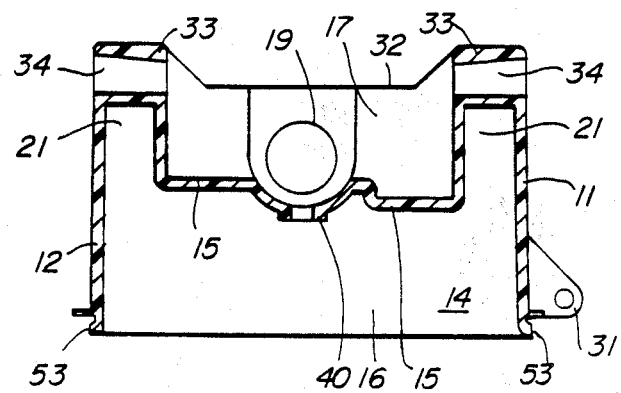
Figure 36:
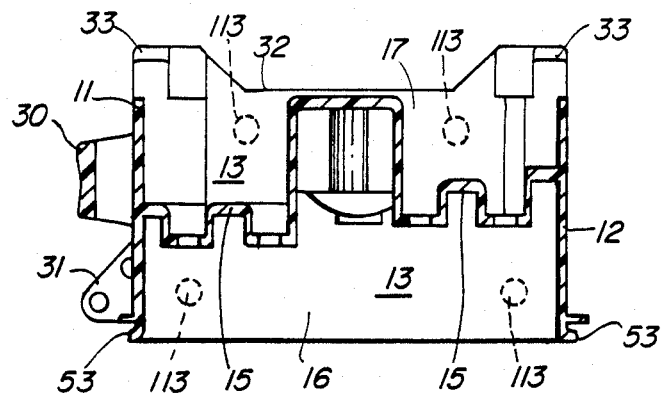
Figure 37:
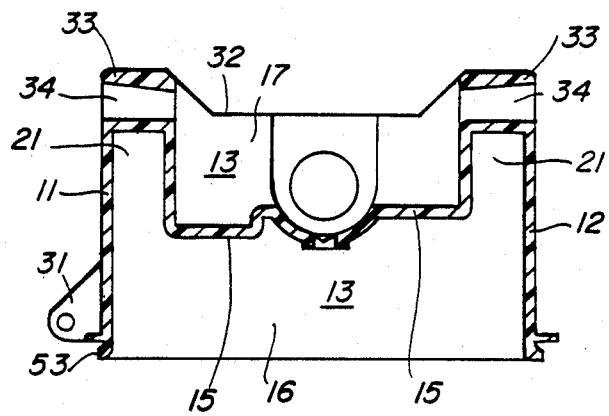
Figure 38:
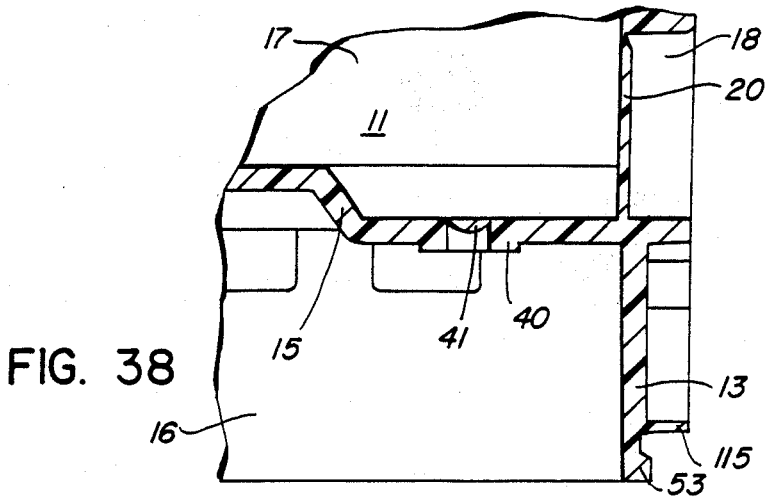
Figure 39:
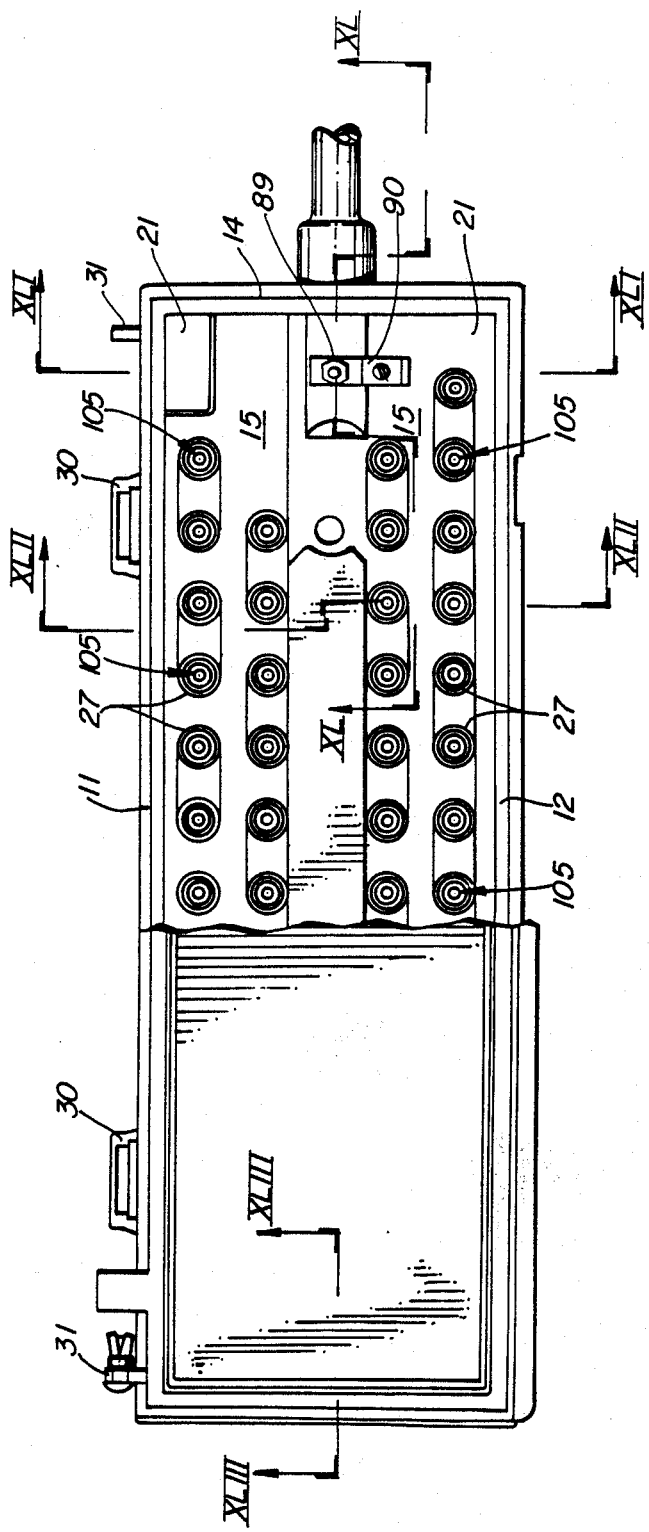
FIG. 39 is a front view of an assembled aerial terminal with a housing as in FIGS. 28 to 38.
Figure 40:
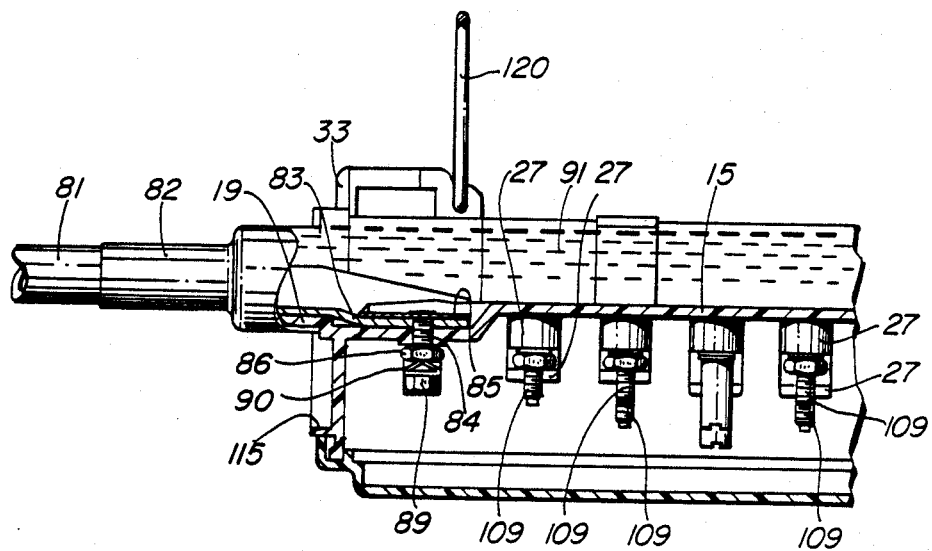
FIGS. 40 to 43 are cross-sections on the lines XL—XL to lines XLIII—XLIII, respectively, on FIG. 39.
Figure 41:
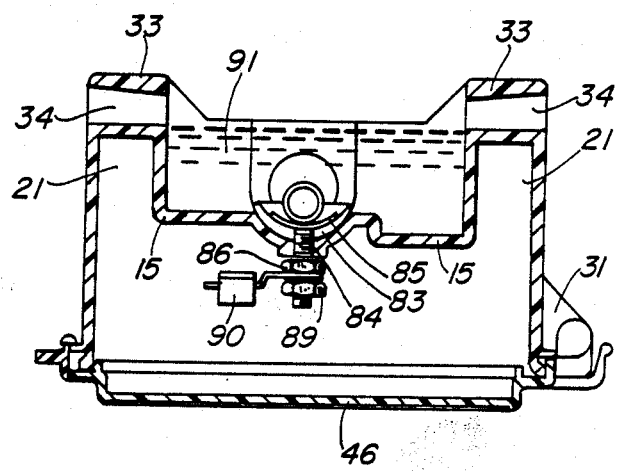

A ground connection is made to the groundplate 60 by means of a ground terminal 79 and nut 80 at one end of the housing or cable terminal. The ground terminal 79 is also connected to the metal sheath of the stub cable. This is illustrated in FIG. 22. A stub cable, 81, enters into the housing 10 via the tubular extension 19, a tubular sleeve sealing the entry. The cable end is opened up, and a slit made in the end of the metal sheath. A ground connector or clamp 84 is inserted into the slit, a plate on the inner end of the connector 84 being on the inside of the sheath. A conductor 87 is connected to the terminal 79 by nut 88. A further nut 89 attaches a ground connection 90. This can be used to connect a ground wire.

When the conductors of a stub cable have been connected to the projections 68 and the wire connections 72 also made, the back chamber 17 is filled with a potting compound, indicated by dotted lines 91. A stub cable can also be brought in from the other end of the housing.

It is not always desired to provide a cable terminal with protection modules. If protection is not required, the capacity of a cable terminal can be effectively doubled as the large bosses 25 for the protector modules are not required. Thus two extra rows of the smaller bosses can be provided. FIGS. 28 to 38 illustrate a housing for a cable terminal without protector modules. Where applicable, common reference numerals have been used for details common with FIGS. 1 to 17.

The housing 10 illustrated in FIGS. 28 to 38 is of elongate form with parallel side walls 11 and 12, and end walls 13 and 14 extending between the side walls. A central wall 15 extends between the side walls 11 and 12, generally at a position intermediate the edges of the side walls. The central wall 15 divides the housing into front and back chambers 16 and 17 respectively.

Access to the back chamber 17 is provided in each end wall. At one end there is provided an aperture 18, in end wall 13, and at the other end there is a tubular extension 19 on end wall 14. Aperture 18 is normally blanked off by a diaphragm 20 which can be broken out. Access by a stub cable is usually via the tubular extension 19, but can also be via the aperture 18.

The central wall 15 has four rows of hollow bosses 27, two rows on one side of a central axis and two rows on the other side of the axis. The bosses extend forward from the central wall 15 into the front chamber 16. The bores 99 of the bosses are open at a back end, being in communication with the back chamber 17. A front wall 116 on each boss has a square aperture 103 therein.

At each end of the central wall 15, at each corner, is a recess 21 for a purpose explained later. On side wall 11 two support brackets 30 are provided. Straps passing through the brackets 30 support the cable terminal from a cable or other member. At each end of side wall 11, adjacent its front edge, are webs 31 to provide pivotal mounting of the cover.

The end walls 13 and 14 have a concave back edge 32. The back edge of each end wall extends, at each end, beyond the back edge of each side wall and has a thickened section 33 formed by the recesses 21. A rectangular passage 34 is formed through each section 33, the passages extending normal to the length of the housing. The sections 33, with passages 34, form mounting brackets for mounting a terminal on a pole or similar member. The concave back edges 32 act to position the terminal on the pole, and straps can be passed through passages 34 and around the pole.

A further mounting means is provided by the hollow bosses 35 on the longitudinal center line. These bosses extend through the back chamber 17 and have back surfaces 36 which are level with the back edges of the end walls. A knockout diaphragm 37 is provided. By removal of the diaphragm 37, bolts, such as carriage bolts, can be used to attach the terminal to a pole. Two smaller bosses 40, adjacent each end wall, provide mounting positions for ground terminals which can be attached to a cable sheath. Knockout diaphragms 41 can be provided.

In side wall 12 a plurality of apertures 42 are provided. Theses provide access to the front chamber 16 for local distribution conductors. The apertures 42 are closed by a rubber sealing member, as will be described.

The cover as illustrated in FIGS. 12 and 13 is also used in combination with the housing as illustrated in FIGS. 28 to 38.

FIGS. 39, 40, 41 and 42 illustrate an assembled cable terminal comprising a housing as illustrated in FIGS. 28 to 38 and a cover as in FIGS. 12 and 13. Positioned in each boss is a terminal 105. The terminals, seen in more detail in FIG. 42, have a square shank 106 which fits in the square aperture 103 in a boss 27. A disc-like formation 107 on the terminal abuts the end wall 116 on the back side and a tang 108 extends toward the back chamber 17. The terminal also extends forward into the front chamber, having a threaded portion 109 and a nut 110. Conductors of the stub cable are attached to the tangs 108, as by wire wrapping, as indicated at 112 in FIG. 42.

A stub cable 81 enters the housing via the tubular extension 19, a sleeve 82 sealing the entry. The cable end is opened up and a slit made in the end of the metal sheath 83. A ground connector or clamp 84 is inserted into the slit, a plate 85 on the connector being on the inside of the sheath. The connector extends through boss 40 and fastened by nut 86. A ground connection 90 is attached by nut 89.

When the conductors of the stub cable have been connected to the tangs 108, the back chamber is usually filled with a potting compound, indicated by dotted lines 91.

Figure 43:
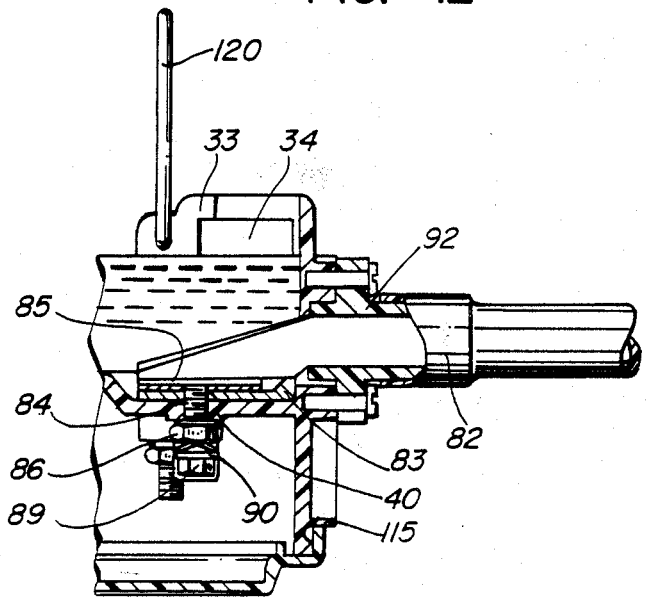

A stub cable can also be brought in from the other end of the housing through a tubular extension 92 bolted on over the aperture 18 (FIG. 31), and this is illustrated in FIG. 43. The same reference numerals are used for the same items as in FIG. 40.

The cable terminal as illustrated in FIGS. 14, 15, 16, 17 and 18 is referred to as a ten and twelve pair protected terminal, the cable terminal of FIGS. 19 to 27, as a twenty-five pair protected terminal, and the cable terminal illustrated in FIGS. 39, 40, 41 and 42 is referred to as a twenty and twenty-five pair unprotected terminal. The number of conductor terminals provided, i.e. terminal studs 69 terminals 105, can be varied depending upon the number of pairs of local distribution conductors that is intended to be provided.

Figure 46:
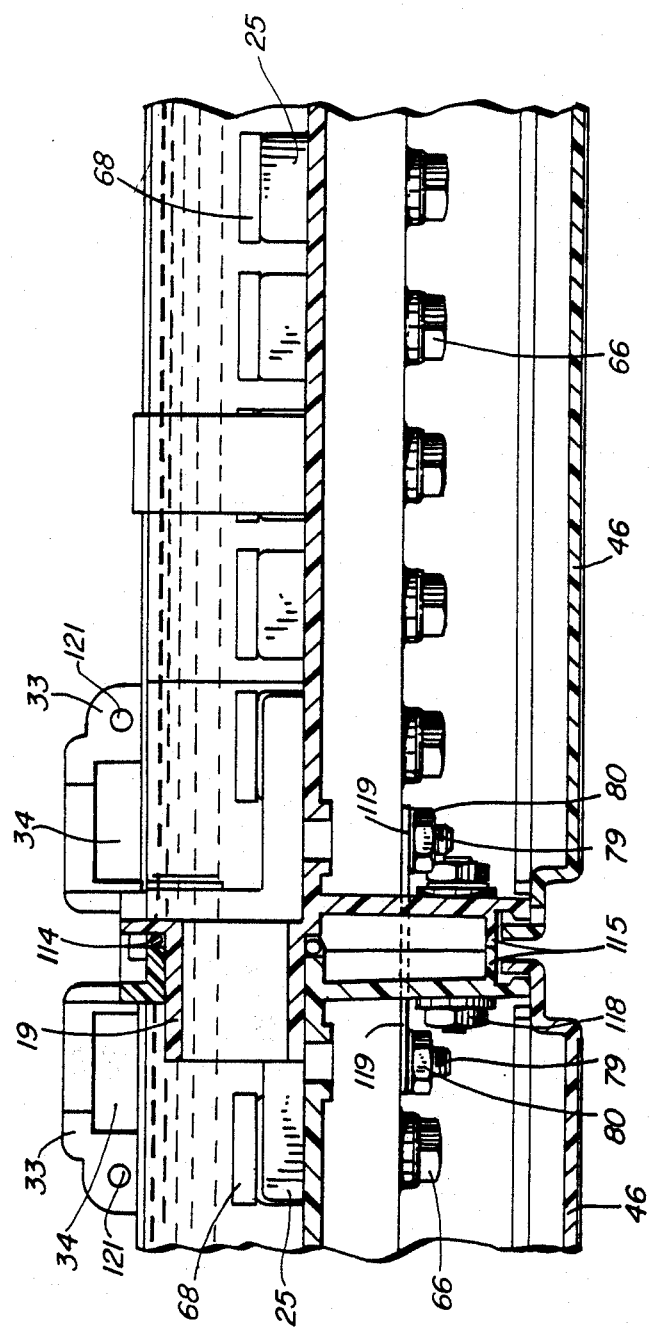
FIG. 46 is a cross-section on the line XLVI—XLVI of FIG. 44.
Figures 47, 48:
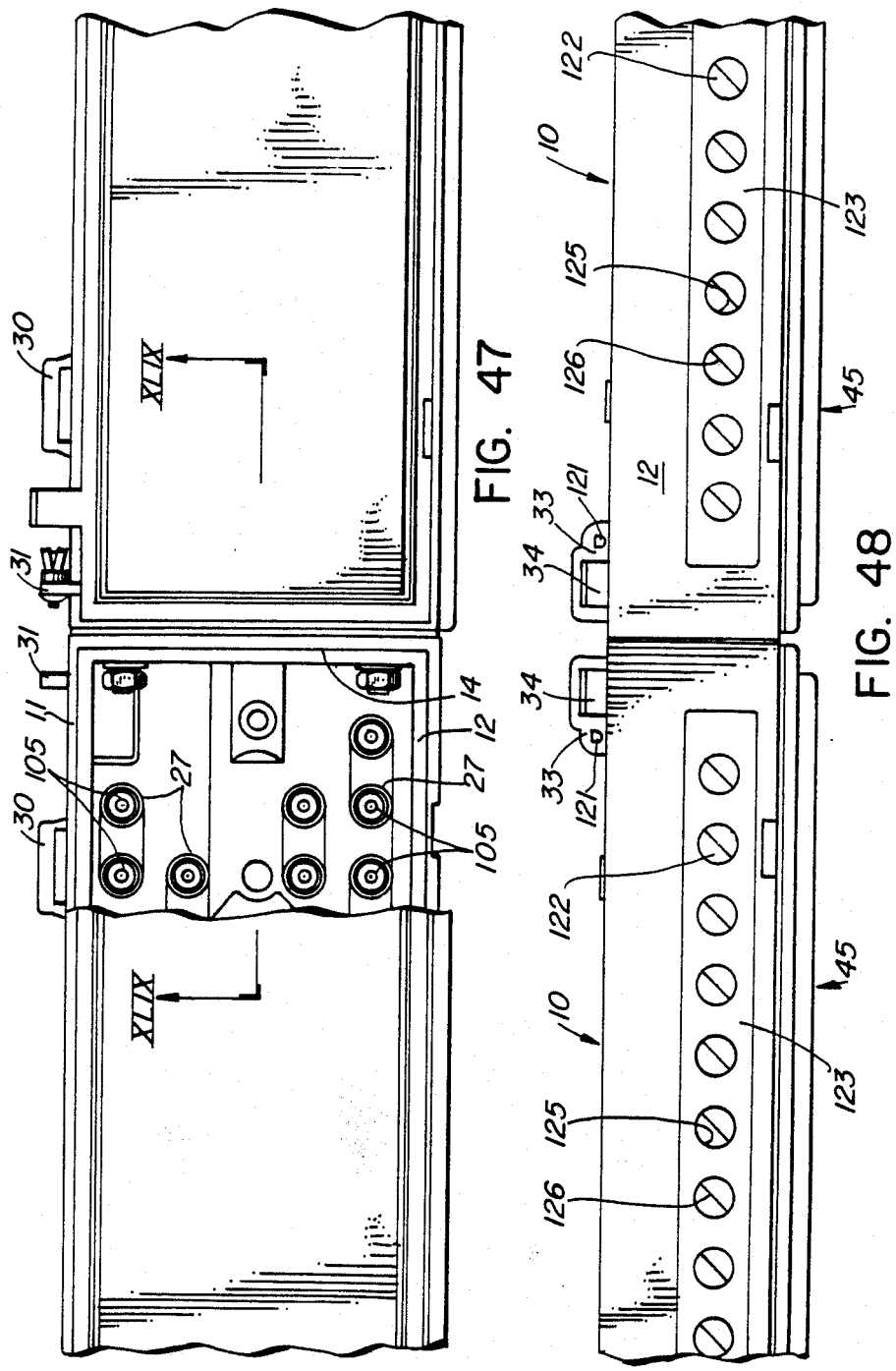
FIGS. 47 and 48 are front and side views, respectively, illustrating two terminals as in FIGS. 39 to 42 joined together.
Figure 49:
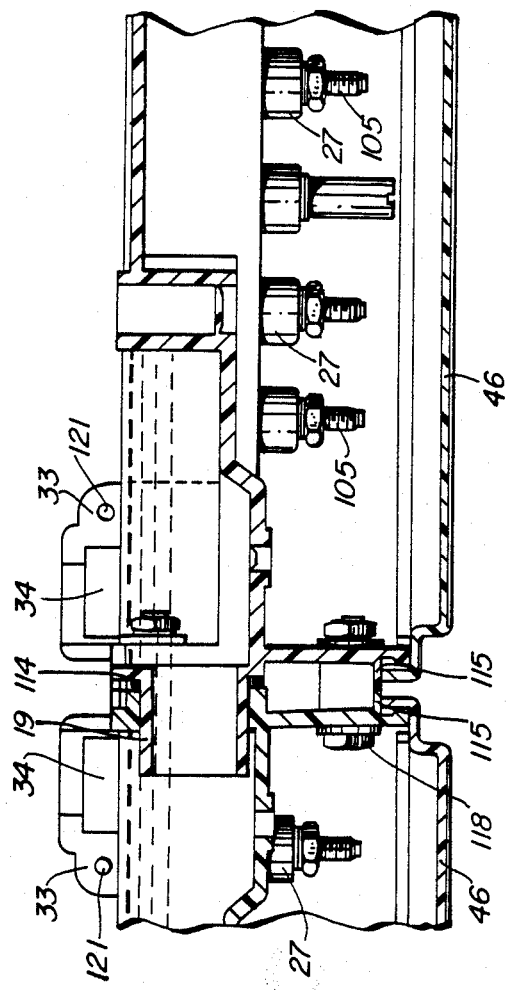
FIG. 49 is a cross-section on the line XLIX—XLIX of FIG. 47.

To increase the number of local distribution conductors which can be handled at one location, a number of individual cable terminals can be connected together. FIGS. 44, 45 and 46 illustrate two ten and twelve pair protected terminals joined together to give what is referred to as a twenty and twenty-five pair protected terminal. FIGS. 47, 48 and 49 illustrate two twenty and twenty-five pair unprotected terminals joined together to give what is referred to as a fifty pair unprotected terminal.

In FIGS. 44, 45 and 46, two cable terminals are joined end-to-end, the cover shown removed for most of the part shown at the left hand terminal in FIG. 44. Each terminal is of the form as illustrated in FIGS. 15 to 18, with the exception that the groundplate 60 of the left hand terminal is connected to the groundplate 60 of the right hand terminal by means of a metal connection 119 extending between and connected to the ground terminals 79 attached to the groundplates. The connection 119 passes through slots in the end walls, indicated in dotted outline at 111 in FIGS. 6 and 8. These slots are normally closed by thin diaphragms which can be broken out. The two terminal housings are coupled together by bolts 118 passing through holes in the end walls of the terminal housings, indicated in dotted outline at 113 in FIGS. 6, 8, 9 and 10. The holes 113 are also normally closed by thin diaphragms.

As can be seen in FIG. 46, the tubular extension 19 on end wall 14 of one housing enters into the aperture 18 in end wall 13 of the other housing, the diaphragm 20 having been removed. An O-ring 114 is positioned around the tubular extension 19 and provides a seal between the housings around the tubular extension. Projections 115 on the end walls of the housings, aligned with the holes 113 near the front edge of the housing, abut to prevent binding of the tubular extension 19 when the bolts are tightened.

FIGS. 47, 48 and 49 illustrate two twenty and twenty-five pair cable terminals joined together to form a fifty pair unprotected terminal. Two terminals are joined end-to-end, part of the cover shown removed in the left hand terminal part shown in FIG. 41. Each terminal is of the form illustrated in FIGS. 39, 40 and 42. The housings of the terminals are coupled by bolt 118 passing through holes in the end walls and shown in dotted outline at 113 in FIGS. 33 and 36. Holes 113 are normally closed by a thin diaphragm. As seen in FIG. 49, the tubular extension 19 on end wall 14 of one housing enters into the aperture 18 in the end wall 13 of the other housing, the diaphragm 20 having been removed. An O-ring 114 is positioned around the tubular extension 19 and provides a seal between the housings around the tubular extension. Projections 115 on the end walls abut to prevent bending of the tubular extension 19 when the bolts are tightened. In each boss 27 is a terminal 105.

Figure 42:
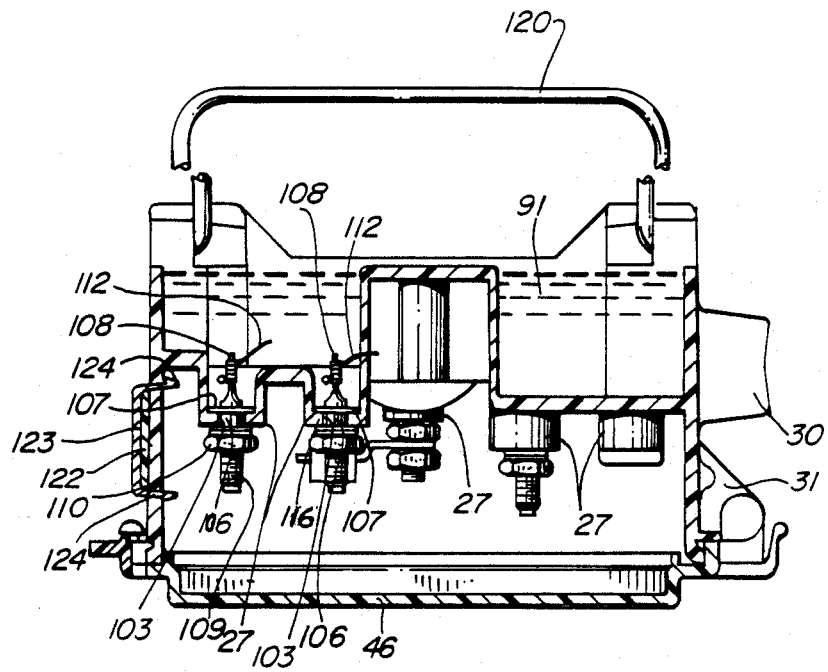

As illustrated in FIGS. 16 and 42, loops 120 are pivotally mounted in holes 121 in the sections 33. These can be used to support conductors.

As previously stated, the apertures 42 in the housings are covered by a rubber sealing member. This is seen in FIGS. 16 and 42 and in FIGS. 45 and 48 The sealing member 122 is a strip of rubber or other elastomeric material, held in position by a coverplate 123 which has spring legs 124 seen in FIGS. 16 and 42. The coverplate has holes 125 aligned with the apertures 42. The sealing member is slit, at 126, so that local distribution conductors can be pushed through into the front chamber of the housing.

What is claimed is:

1. An aerial cable terminal comprising:
    an elongate hollow housing having parallel side walls and parallel end walls extending between the side walls, and a central wall extending between the side walls to divide the housing into two chambers, a front chamber and a back chamber;
    a plurality of pairs of apertures in the central wall, the pairs extending in rows between the end walls, one aperture of each pair on one side of a central axis and the other aperture of each pair on the other side of the central axis;
    a terminal mounted in each aperture, each terminal having a front end extending into said front chamber and a rear end extending into said back chamber, the terminals in a pair of apertures forming a pair of terminals;
    conductor means extending between the rear ends of each terminal of a pair;
    access means in one end for entry of a stub cable into said back chamber;
    an openable cover closing said front chamber; and
    support means on a side wall and on each end wall, whereby the terminal housing can be mounted alternatively on a cable or on a pole.

2. An aerial terminal as claimed in claim 1, including means for attachment of a drop wire conductor to the front end of one terminal of each pair and means for attaching a stub cable conductor to the rear end of the other terminal of a pair.

3. An aerial terminal as claimed in claim 2, including ground means extending along said housing, and means connecting the front end of each of said other terminals to said ground means.

4. An aerial terminal as claimed in claim 3, including protector means associated with each of said other terminals.

5. An aerial terminal as claimed in claim 4, said ground means comprising a groundplate extending along said housing on one side of said central axis, and apertures in said groundplate, an aperture aligned with each aperture in the central wall on one side of said central axis, the peripheral edges of said apertures in said groundplate being formed into a lip, and an external thread in each lip, said protector means each including a metal cap screwed into said internal thread.

6. An aerial terminal as claimed in claim 2, said access means including an aperture in an end wall in communication with said back chamber for entry of said stub cable into said back chamber.

7. An aerial terminal as claimed in claim 6, including a further aperture in said central wall, adjacent said one end; a ground terminal in said further aperture; means for connecting said ground terminal to a metallic sheath of said stub cable.

8. An aerial terminal as claimed in claim 6, including an aperture in the other end wall in communication with said back chamber; a tubular extension aligned with one of the apertures in the end walls, the tubular extension of a first housing adapted to engage within the aperture in the end wall of a second housing, for connection of two housings end-to-end.

9. An aerial terminal as claimed in claim 2, including a plurality of apertures in one side wall, said apertures in communication with said front chamber, for passage of said drop wire conductors into said front chamber.

10. An aerial terminal as claimed in claim 9, including a sealing member sealing said apertures in said side wall.

11. An aerial terminal as claimed in claim 1, including four rows of apertures in said central wall, two rows on each side of said central axis.

12. An aerial terminal as claimed in claim 11, each aperture in a row remote from said central axis on one side of said central axis being paired with an aperture in a row adjacent to said central axis on the other side of the central axis.

13. An aerial terminal as claimed in claim 1, said openable cover pivotally attached to said housing to enclose said front chamber.

14. An aerial terminal as claimed in claim 1, including access means at the other end for entry of a stub cable into said back chamber.

15. An aerial terminal as claimed in claim 1, each said end wall having a concave periphery at a back edge.

16. A aerial terminal as claimed in claim 1, said support means including brackets on one side wall, each bracket including an aperture, whereby, fastening means can pass through said brackets to attach said housing to a support member.

17. An aerial terminal as claimed in claim 1, said support means including brackets on a back edge of each end wall, each bracket including an aperture, whereby fastening means can pass through the brackets to attach said housing to a support member.

18. An aerial terminal as claimed in claim 1, including a hollow boss on said central wall adjacent each end, said hollow bosses positioned on said central axis, whereby fastening means can extend through said bosses to attach said housing to a support member.

19. An aerial terminal as claimed in claim 1, said central wall extending across said housing between said side walls at at least two levels.

* * * * *